US008819728B2

(12) United States Patent
Fleischman

(10) Patent No.: US 8,819,728 B2
(45) Date of Patent: Aug. 26, 2014

(54) TOPIC TO SOCIAL MEDIA IDENTITY CORRELATION

(71) Applicant: BlueFin Labs, Inc., Cambridge, MA (US)

(72) Inventor: Michael Ben Fleischman, Somerville, MA (US)

(73) Assignee: Bluefin Labs, Inc., Cambridge, MA (US)

( * ) Notice: Subject to any disclaimer, the term of this patent is extended or adjusted under 35 U.S.C. 154(b) by 0 days.

(21) Appl. No.: 13/900,206

(22) Filed: May 22, 2013

(65) Prior Publication Data

US 2013/0305282 A1    Nov. 14, 2013

Related U.S. Application Data

(63) Continuation of application No. 13/467,281, filed on May 9, 2012.

(51) Int. Cl.
| | | |
|---|---|---|
| H04N 7/10 | (2006.01) | |
| H04N 7/025 | (2006.01) | |
| H04N 7/173 | (2011.01) | |
| G06Q 50/00 | (2012.01) | |
| H04N 21/435 | (2011.01) | |
| H04N 21/234 | (2011.01) | |
| H04N 21/258 | (2011.01) | |
| H04N 21/442 | (2011.01) | |
| H04N 21/81 | (2011.01) | |
| G06Q 30/00 | (2012.01) | |

(52) U.S. Cl.
CPC ............ H04N 21/435 (2013.01); G06Q 50/01 (2013.01); H04N 21/23424 (2013.01); H04N 21/25875 (2013.01); H04N 21/44222 (2013.01); H04N 21/812 (2013.01); G06Q 30/00 (2013.01)

USPC ........................................... 725/34; 725/110

(58) Field of Classification Search
None
See application file for complete search history.

(56) References Cited

U.S. PATENT DOCUMENTS

| | | | |
|---|---|---|---|
| 7,064,796 B2 | 6/2006 | Roy et al. | |
| 7,302,404 B2 | 11/2007 | Solomon | |
| 8,019,875 B1 | 9/2011 | Nielsen | |
| 2001/0029525 A1 | 10/2001 | Lahr | |
| 2002/0059094 A1* | 5/2002 | Hosea et al. ................. 705/10 |
| 2002/0104083 A1 | 8/2002 | Hendricks et al. | |
| 2003/0066077 A1 | 4/2003 | Gutta et al. | |
| 2005/0076230 A1 | 4/2005 | Redenbaugh et al. | |
| 2006/0212900 A1 | 9/2006 | Ismail et al. | |

(Continued)

OTHER PUBLICATIONS

United States Office Action, U.S. Appl. No. 13/467,281, Mar. 11, 2013, 38 pages.

*Primary Examiner* — Nathan Flynn
*Assistant Examiner* — William J Kim
(74) *Attorney, Agent, or Firm* — Fenwick & West LLP

(57) ABSTRACT

An identification server correlates the web browsing behavior of individuals with their use of social media systems. Based on these behaviors, web identifiers (referred to as identities or IDs) may be matched to social media identifiers; these matches being determined, stored, and output as a confidences that the web identity of the user corresponds to a social media identity. Each web identity may be associated with one or more social media identities. The identity correlations between web identities and social media identities may be used along with other alignments to provide information regarding the time-based media (e.g., advertisements) a user may have likely been exposed to, topics the user is interested in, and to provide targeted advertisements.

18 Claims, 10 Drawing Sheets

(56) References Cited

U.S. PATENT DOCUMENTS

| | | |
|---|---|---|
| 2007/0186254 A1 | 8/2007 | Tsutsui et al. |
| 2008/0028036 A1* | 1/2008 | Slawson et al. ............... 709/217 |
| 2008/0147482 A1 | 6/2008 | Messing et al. |
| 2009/0070219 A1 | 3/2009 | D'Angelo et al. |
| 2009/0144385 A1 | 6/2009 | Gold |
| 2009/0164897 A1* | 6/2009 | Amer-Yahia et al. ......... 715/703 |
| 2009/0171948 A1 | 7/2009 | Solomon et al. |
| 2010/0023399 A1 | 1/2010 | Sahni et al. |
| 2010/0274815 A1 | 10/2010 | Vanasco |
| 2010/0333127 A1 | 12/2010 | Scott et al. |
| 2011/0040760 A1* | 2/2011 | Fleischman et al. .......... 707/737 |
| 2011/0041080 A1* | 2/2011 | Fleischman et al. .......... 715/751 |
| 2011/0055017 A1* | 3/2011 | Solomon et al. ........... 705/14.66 |
| 2012/0110071 A1* | 5/2012 | Zhou et al. .................... 709/204 |

\* cited by examiner

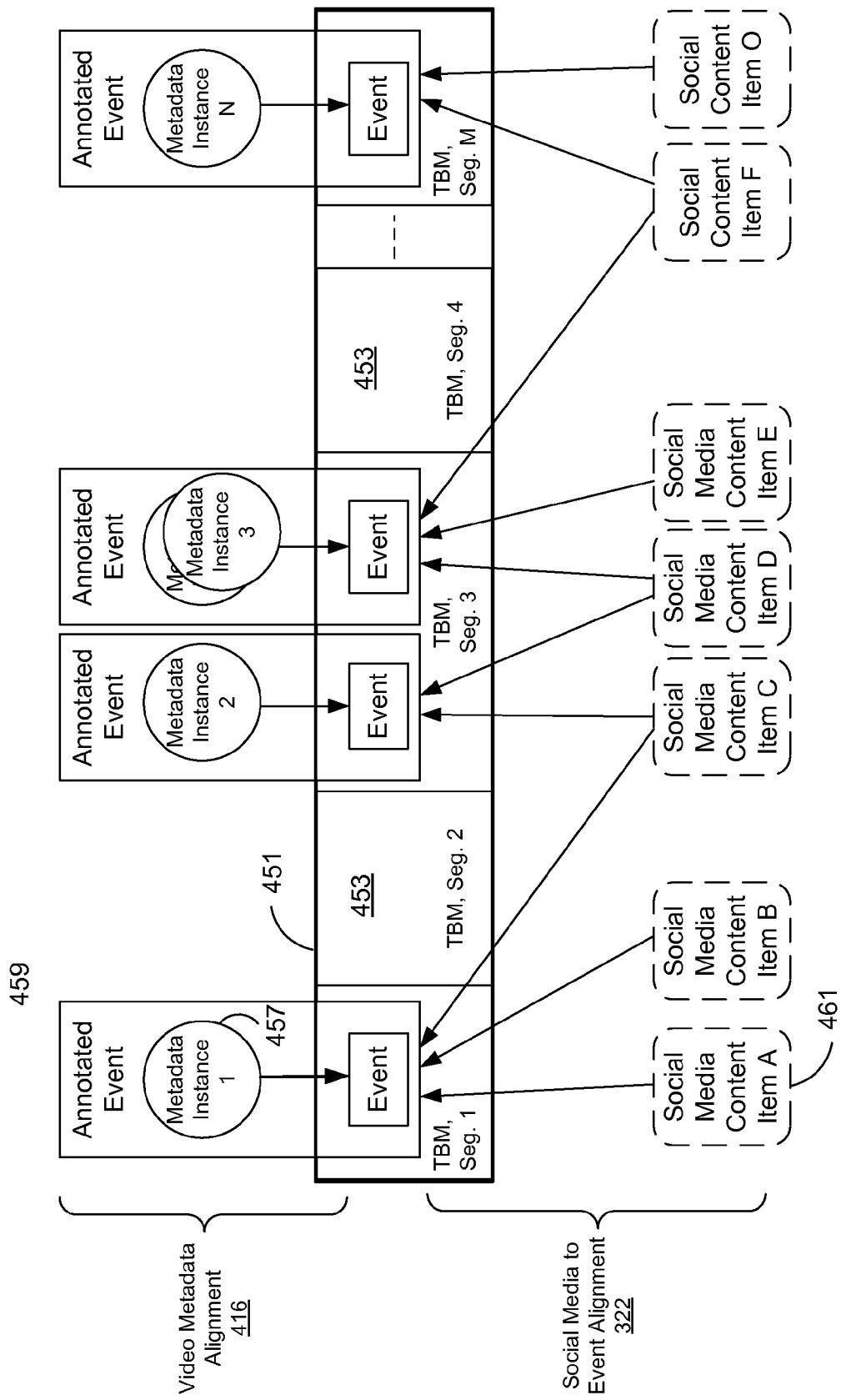

TOPIC TO SOCIAL MEDIA IDENTITY CORRELATION

CROSS REFERENCE TO RELATED APPLICATIONS

This application is a continuation of U.S. patent application Ser. No. 13/467,281 filed on May 9, 2012, entitled "Web Identity to Social Media Identity Correlation", the contents of which are incorporated herein by reference.

FIELD OF THE INVENTION

The present invention relates generally to correlating web cookie content with social media content and using those correlations to send targeted advertisements to web users.

BACKGROUND OF THE INVENTION

Online social media services, such as social networking sites, search engines, news aggregators, blogs, and the like provide a rich environment for users to comment on events of interest and communicate with other users. Social media content items authored by users of social networking systems often include references to events that appear in time based media such as television shows, news reports, sporting events, movies, concert performances, and the like. However, although the content items can sometimes refer to the time-based media, the social media content items themselves typically are isolated from the events and time-based media that those content items refer to; for example, the social content items appear in online social networks provided over the Internet, while the events occur in other contexts and systems, such as television programming provided on broadcast systems. Additionally, identities and behavior of social media users are isolated within the social network, and are not connected with identities and behavior of users of the internet more generally.

SUMMARY OF THE INVENTION

An identification server matches the web browsing behavior of an individual with their use of social media systems to correlate the individual's social media (SM) identity (ID) to the individual's web ID. To determine this correlation, the identification server matches the website browsing behavior contained in a cookie for a web ID with the content of SM content items authored by a user with the SM ID. The correlation may be expressed as a confidence score that a web ID corresponds to one or more SM IDs, or vice versa. In one embodiment, web IDs and SM IDs are correlated by matching the uniform resource locators (URLs) of websites visited by a web ID along with the times those websites were visited to URLs contained within SM content items authored by a user with the SM ID, and the times when those SM content items were posted.

The identity correlations between web IDs and SM IDs may be used along with other alignments to provide messages containing information such as topics individuals are interested in and the time-based media (e.g., ads, TV shows) to which those individuals have likely been exposed. For example, the identification server can detect the airing of advertisements within time-based media streams (referred to as the airing overlap). The identification server may also determine alignments between SM content items authored by SM IDs and the time-based media events (e.g., television shows and advertisements) to which those content items refer.

As a result, the identification server can identify what shows or advertisements a user with a given SM ID has most likely seen. This identification thereby links the user's activities in the social media context (the user's social media content) with the user's activity in an entirely unrelated context such as topic interest and television programming (watching television programming and advertisements), in the absence of any formal, predefined relationship between these two contexts or events occurring therein.

The identification server may use the determination of what shows or advertisements a user with a particular SM ID has likely seen and the correlations between web IDs and SM IDs to send (or assist in the sending) of targeted messaging to the web ID associated with the particular user. To assist in the sending of targeted messages to web IDs, the identification server may act as a resource for a website host (e.g., Comcast™, AOL™, GoDaddy™), a social networking system (e.g., Facebook™, Twitter™), or an advertisement bidding system (e.g., Google™ Ad Words, DataXu™) that sends advertisements to web IDs, for example by displaying ads in a website browser in use by a user.

The input and output of the identification server depends upon the implementation. The identification server may be configured to push data, for example by pushing individual messages, pushing messages in batches, sending a data feed, and/or sending a message responsive to the airing of an advertisement or time-based media stream. Data may also be pulled from the identification server, for example in response to a request containing a cookie, a web ID, a SM ID, or demographic or targeting information for a group of users.

The data output by the identification server may include a fully constructed advertisement, advertising material for custom-tailoring an advertisement to a recipient user, a list of one or more SM IDs or web IDs, topics of interest, and/or targeting criteria for indicating who the recipient/s of a given message should be. The recipient of a message sent by the identification server may be an individual user associated with a web or SM ID or a group of users. The intended recipient/s of a message may be specified directly by SM IDs or web IDs, or indirectly by targeting criteria contained in the message.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

FIG. 4A is a conceptual diagram illustrating the video to metadata and social media to event alignment processes at a high level according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
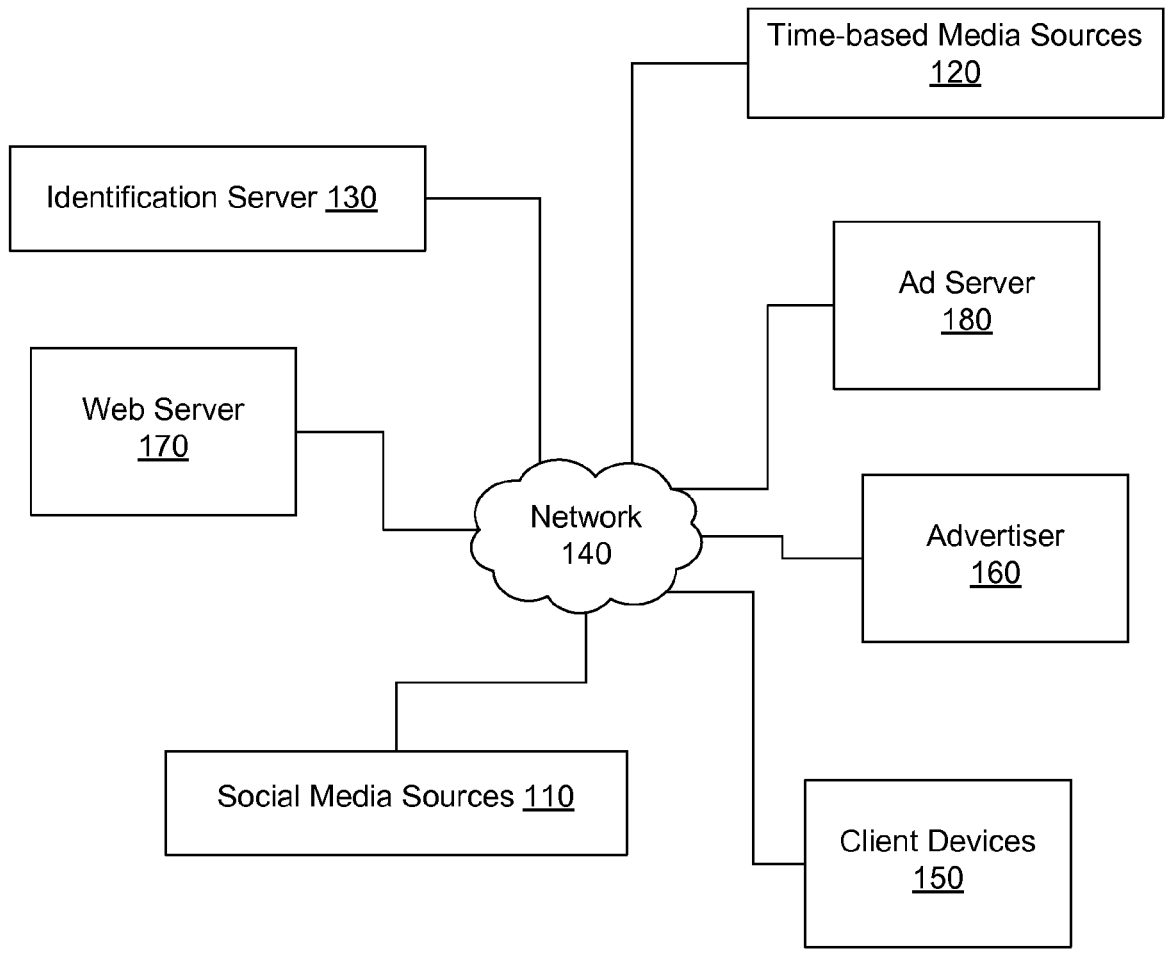
FIG. 1 illustrates the computing environment of one embodiment of a system for correlating web identities and social media identities.

FIG. 1 illustrates the computing environment of one embodiment of a system for identifying a web identity (ID or identifier) and a social media (SM) ID of a user. The environment 100 includes social networking sources 110, time-based media sources 120, the identification server 130, a network 140, client devices 150, advertisers 160, web servers 170, and ad server 180.

The social media sources 110 include social networks, blogs, news media, forums, user groups, etc. Examples of SM sources include social networking systems such as Facebook™ and Twitter™. These systems generally provide a plurality of SM users, each having a SM identity (SM ID), with the ability to communicate and interact with other users of the system (i.e., individuals with other SM IDs). For purposes of convenience, the term "SM ID" will be used herein as both a literal referring to actual data comprising the social media identifier, as well as a reference to a user associated with the SM ID (e.g., as in "An SM ID can post to a social media network").

SM IDs can typically author various SM content items (e.g., posts, videos, photos, links, status updates, blog entries, tweets, profiles, and the like), which may refer to media events (e.g., TV shows, advertisements) or other SM content items (e.g., other posts, etc., pages associated with TV shows or advertisements), and can engage in discussions, games, online events, and other participatory services. The SM ID may be referred to as the author of a particular SM content item.

The time-based media sources 120 include broadcasters, direct content providers, advertisers, and any other third-party providers of time-based media content. These sources 120 typically publish content such as TV shows, commercials, videos, movies, serials, audio recordings, and the like.

The network 140 may comprise any combination of local area and/or wide area networks, the Internet, or one or more intranets, using both wired and wireless communication systems.

The client devices 150 comprise computing devices that can receive input from a user and can transmit and receive data via the network 140. For example, client devices 150 may be a desktop computer, a laptop computer, a smart phone, a personal digital assistant (PDAs), or any other device including computing functionality and data communication capabilities. A client device 150 is configured to communicate with web servers 170, SM sources 110, time-based media sources 120, and ad servers 180 via the network 140.

Advertisers 160 include companies, advertising agencies, or any other third-party organizations that create, distribute, or promote advertisements for web or SM users. Advertisements include not only individual advertisements (e.g., video ads, banner ads, links or other creatives), but also brands, advertising campaigns, and flights, and targeted advertisements. Advertisements may be published in the social networks 110 alongside other content, posted in websites hosted by web servers 170, sent directly to client devices 150, or inserted into time-based media sources 120. Advertisements may be stored on servers maintained by the advertisers 160, they may be sent to the identification server 130 and stored there, they may be sent to the SM sources 110 and stored there, and/or they may be sent to the ad servers 180 or web server 170 and stored there. Advertisements may be sent to users by the ad servers 180, by the web servers 170, by the SM sources 110, by the advertisers 160, or by the client devices 150. These systems may also work in conjunction to request, create, and send advertisements.

The identification server 130 determines web ID of a user in terms of one or more SM IDs, and uses these correlations between identities to send messages as further described in conjunction with FIGS. 2-7.

Figure 2:
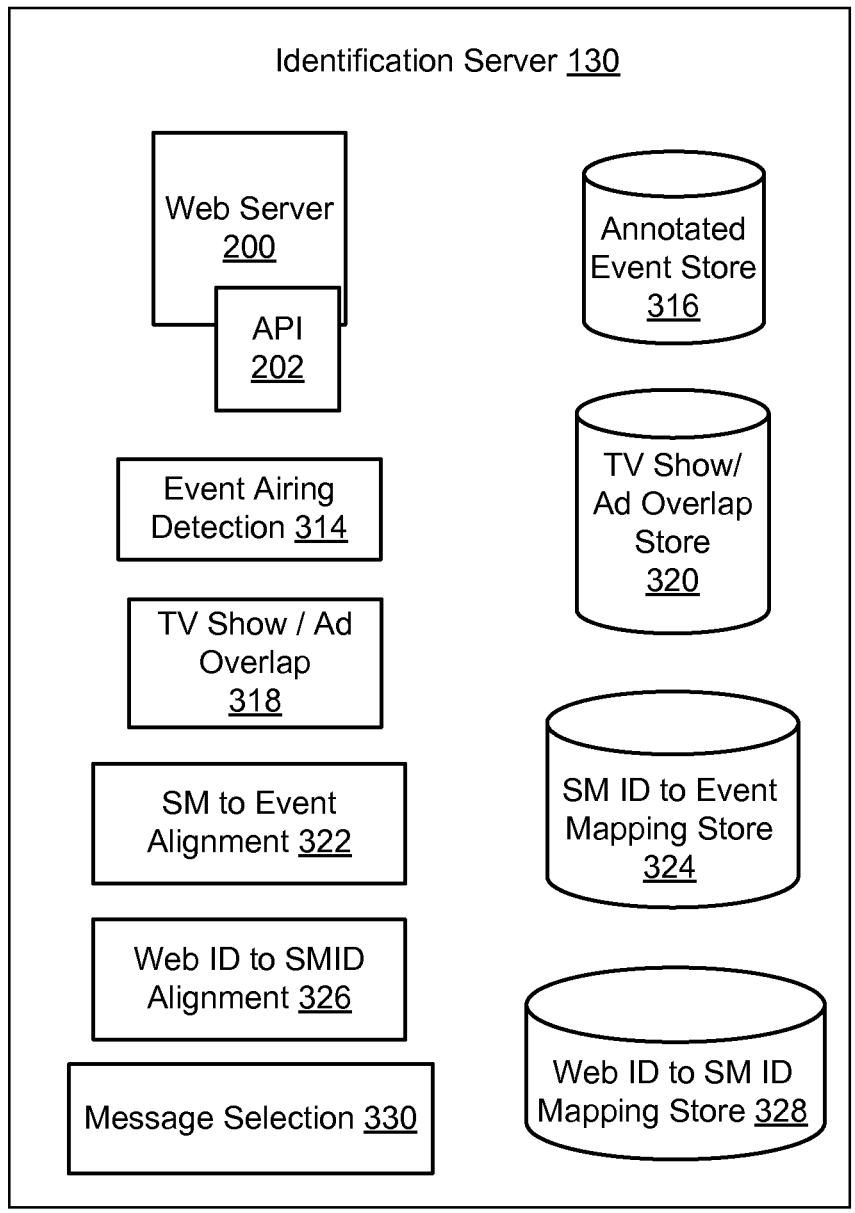
FIG. 2 is a block diagram of one embodiment of an identification server.

FIG. 2 is a block diagram of one embodiment of an identification server. The identification server 130 shown in FIG. 2 is a computer system that includes a web server 200 and associated API 202, an event airing detection 314 system, a TV show/ad overlap 318 engine, a SM to event alignment 322 engine, a web ID to SM ID alignment 326 engine, a message selection 330 engine, an annotated event store 318, a TV show/ad overlap store 320, a SM ID to event mapping store 324, and a web ID to SM ID mapping store 328.

The identification server 130 may be implemented using a single computer, or a network of computers, including cloud-based computer implementations. The computers are preferably server class computers including one or more high-performance CPUs, 1 G or more of main memory, as well as 500 GB to 2 Tb of computer readable, persistent storage, and running an operating system such as LINUX or variants thereof. The operations of the server 130 as described can be controlled through either hardware or through computer programs installed in computer storage and executed by the processors of such servers to perform the functions described herein. The server 130 includes other hardware elements necessary for the operations described here, including network interfaces and protocols, security systems, input devices for data entry, and output devices for display, printing, or other presentations of data; these and other conventional components are not shown so as to not obscure the relevant details.

As noted above, server 130 comprises a number of "engines," which refers to computational logic for providing the specified functionality. An engine can be implemented in hardware, firmware, and/or software. An engine may sometimes be equivalently referred to as a "module," "system", or a "server." It will be understood that the named components represent one embodiment of the present invention, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the server 130, loaded into memory, and executed by the one or more processors of the system's computers. The operations of the server 130 and its various components will be further described below with respect to the remaining figures. As will become apparent, the various data processing operations described herein are sufficiently complex and time consuming as to require the operation of a computer system such as the server 130, and cannot be performed merely by mental steps.

The web server 200 links the server 130 to the network 140 and the other systems described in FIG. 1. The web server 200 serves web pages, as well as other web related content, such as Java, Flash, XML, and so forth. The web server 200 may include a mail server or other messaging functionality for receiving and routing messages between the server 130 and the other systems described in FIG. 1.

The API 202, in conjunction with web server 200, allows one or more external entities to access information from the server 130. The web server 200 may also allow external entities to send information to the server 130 calling the API 202. For example, an external entity sends an API request to the server 130 via the network 140 and the web server 200 receives the API request. The web server 200 processes the request by calling an API 202 associated with the API request to generate an appropriate response, which the web server 200 communicates to the external entity via the network 140. The API may be used by a SNS 110 to communicate information and requests to the server 130.

Figure 3:
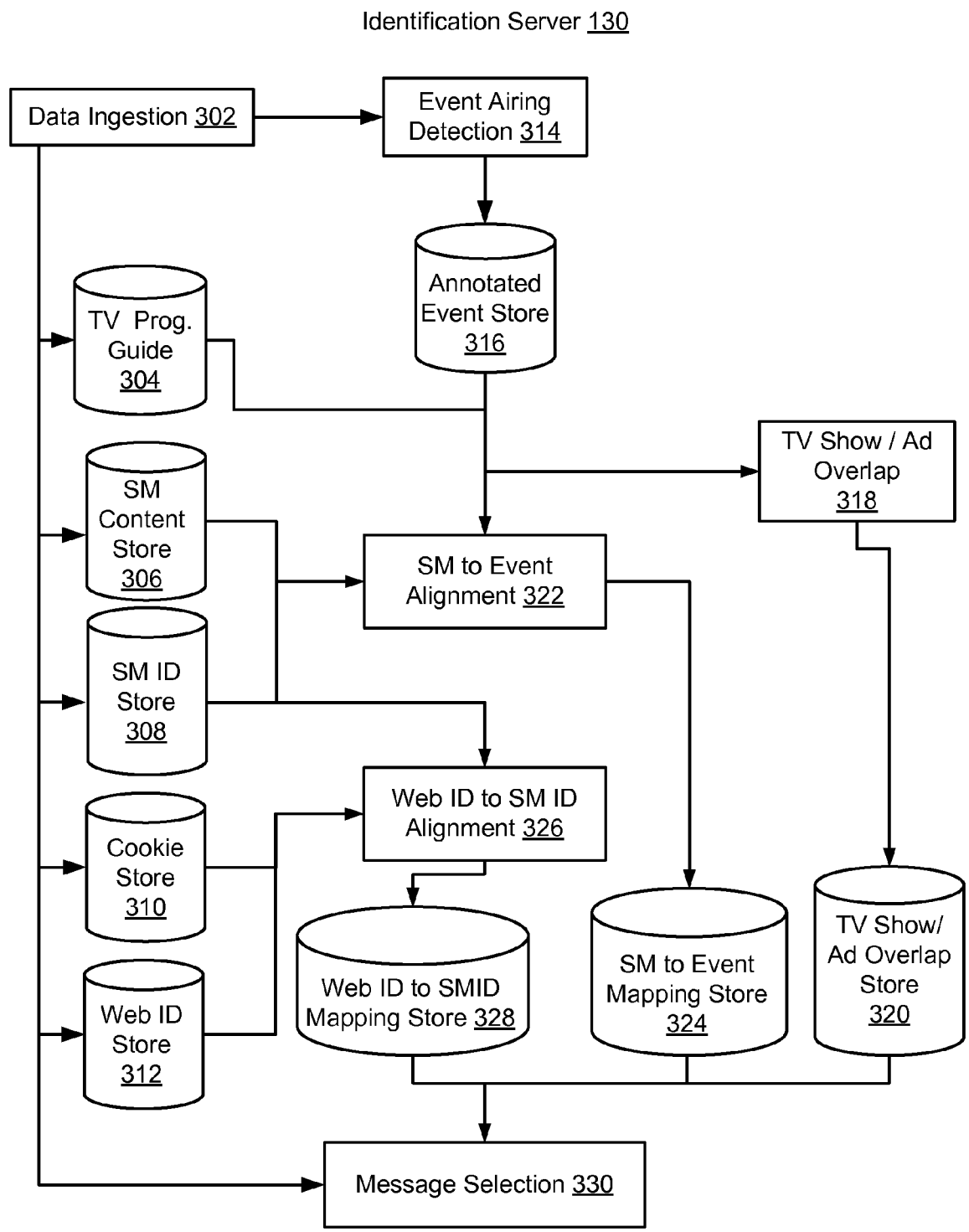
FIG. 3 is a block diagram and flowchart of an alignment and identification process at a high level according to one embodiment.

The remainder of the components of the identification server 130 are described with respect to FIG. 3. FIG. 3 is a block diagram and flowchart of an alignment and identification process at a high level according to one embodiment. The identification server 130 accesses and stores a number of different items of information through data ingestion 302, which may be performed by the web server 200. The ingested data includes time-based media streams (not shown), TV programming guide data stored in store 304, SM content items stored in SM content store 306, SM author information stored in SM ID store 308, cookies of web behavior for web users stored in cookie store 310, and web user information stored in web ID store 312.

The time-based media is used in an event airing detection 314 process to identify the airings of individual events (e.g., advertisements, TV shows). The events are stored in the annotated event store 316. Event airing detection 314 is described further below with respect to FIGS. 4A-4D. The annotated events 316 are used in two distinct processes. The annotated events 316 are used, in conjunction with the TV programming guide data 304 in a TV show to advertisement overlap process 318, described further below, that determines which advertisements aired during which TV shows. The annotated events 316 and TV programming guide date 304 are also used to align SM content items and their authors (i.e., SM IDs) with the annotated events. The mappings between SM content items, SM IDs, and annotated events indicate which content items are likely to have been seen by which SM IDs. These mappings are stored in mapping store 324. SM to event alignment 322 is described further below with respect to FIG. 5.

In addition to the above, the identification server 130 is also configured to align 326 the SM ID of a user to the web ID of the user. To align 326 these two IDs, the identification server 130 matches the web browsing behavior associated with a web ID with the web links contained in the SM content items authored by a SM ID. SM ID to web ID alignments are stored in mapping store 328. SM ID alignment to web ID alignment 326 is described further below with respect to FIG. 6.

The web ID to SM ID alignments, SM to event alignments, and TV show to advertisement overlaps are used by a message selection engine 330 to either send targeted messages directly to SM users or web users, or to assist other systems in sending targeted messages to those users. Examples of the various use cases for message selection 330 are described further below with respect to FIG. 7.

Determining Airings of Time-Based Media Events

FIG. 4A is a conceptual diagram illustrating the video to metadata and SM to event alignment processes at a high level according to one embodiment. Beginning with metadata instances 457 and events in time-based media 301 as input, annotated events 459 are formed. As shown, time-based media (TBM) 451 includes multiple segments (seg. 1-M) 453, which contain events in the time-based media, as described herein. The video to metadata alignment 416 process aligns one or more metadata instances (1-N) 457 with the events to form annotated events 459, as further described in conjunction with FIG. 4D. The SM to event alignment 322 process aligns, or "maps," the annotated events 459 resulting from the video to metadata alignment 416 to one or more SM content items (A-O) 461, as further described in conjunction with FIG. 5. Note that in both processes 416, 322, the various alignments are one-to-one, many-to-one, and/or many-to-many. Thus, a given SM content item 461 can be mapped to multiple different annotated events 459 (e.g., SM content items C, D, and F), and an annotated event 459 can be mapped to multiple different SM content items 461. Once so mapped, the relationships between content items and events can be quantified to estimate social interest, as further explained below.

Figure 4B:
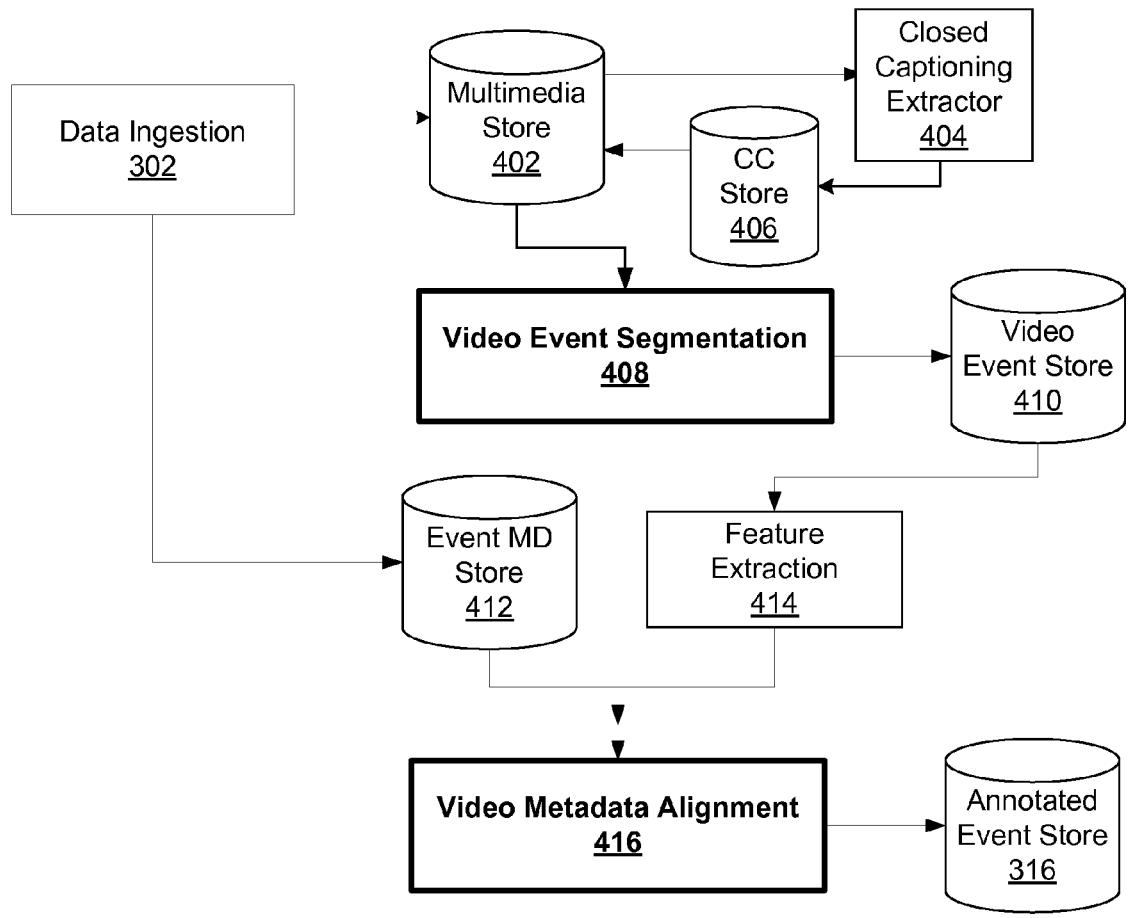
FIG. 4B is a block diagram and flowchart illustrating one embodiment of a method for determining the airings of time-based media events.

FIG. 4B is a block diagram and flowchart illustrating one embodiment of a method for determining the airings of time-based media events. Multiple streams of data are ingested 302 at the server 130 for processing. Data may be received at the server 130 from any of the systems described in FIG. 1, Particularly, the data ingested includes time-based media streams, e.g., from broadcast television feeds, radio feeds, internet streams, directly from content producers, and/or from other third parties. In one embodiment, web server 200 is one means for ingesting 302 the data. The ingested data may also include, but is not limited to, electronic programming guide 304 data, closed captioning data, statistics, SM posts, mainstream news media, and usage statistics.

The ingested data may be stored in data stores specific to the type of data For example, time-based media data is stored in the multimedia store 402. The time-based media in the multimedia store 402 may undergo additional processing before being used within the methods shown in FIGS. 3-6. For example, closed captioning data can be extracted from data using extractor 404, and stored in a closed caption store 406 separately or in conjunction with the multimedia store 402. In addition, time-based media event metadata associated with media events is stored in the event metadata store 412.

Closed captioning data typically can be extracted from broadcast video or other sources encoded with closed captions using open source software such as CCExtractor available via SourceForge.net. For time-based media not encoded with closed captioning data, imperfect methods such as automatic speech recognition can be used to capture and convert the audio data into a text stream comparable to closed captioning text. This can be done, for example, using open source software such as Sphinx 3 available via SourceForge.net. Once the closed captioning is ingested, it is preferably correlated to speech in a video. Various alignment methods are known in the art. One such method is described in Hauptmann, A. and Witbrock, M., *Story Segmentation and Detection of Commercials in Broadcast News Video*, ADL-98 Advances in Digital Libraries Conference, Santa Barbara, Calif. (April 1998), which uses dynamic programming to align words in the closed captioning stream to the output of a speech recognizer run over the audio track of the video.

The multimedia store 402 stores various forms of time-based media. Time-based media includes any data that changes meaningfully with respect to time. Examples include, and are not limited to, videos, (e.g., TV shows or portions thereof, movies or portions thereof) audio recordings, MIDI sequences, animations, and combinations thereof. Time-based media can be obtained from a variety of sources, such as local or network stores, as well as directly from capture devices such as cameras, microphones, and live broadcasts. It is anticipated that other types of time-based media within the scope of the invention will be developed in the future (e.g., 3D media, holographic presentations, immersive media, and so forth).

The event metadata store 412 stores metadata related to time-based media events. Such metadata can include, but is not limited to: the type of event occurring, the brand/product for which an advertisement event is advertising, the agents actors/characters involved in the event, the scene/location of the event, the time of occurrence and time length of the event, the results/causes of the event, etc. For example, metadata for an advertisement event may include information such as "Brand: Walmart; Scene: father dresses up as clown; Mood: comic." As illustrated in these examples, the metadata can be structured as tuples of <name, value> pairs.

Metadata may also include low level features for an event, e.g., image or audio features or content features, hand annotations with text descriptions, or both. Metadata may be represented as text descriptions of time-based media events and as feature vector representations of audio and/or video content extracted from examples of events. Examples of such metadata include a number and length of each shot, histograms of each shot (e.g., color, texture, edges, gradients, brightness, etc.), and spectral information (e.g., frequency coefficients, energy levels) of the associated audio. Metadata may be generated using human annotation (e.g., via human annotators watching events or samples thereof) and may be supplemented with automatic annotations. Metadata may also include different types of features including but not limited to scale-variant feature transform (SIFT), speeded up robust features (SURF), local energy based shape histogram (LESH), color histogram, and gradient location orientation histogram (GLOH).

A video event segmentation process 408 segments time-based media streams (e.g., raw video and/or audio) into semantically meaningful segments corresponding to discrete events depicted in video at semantically meaningful boundaries. This process is described with respect to FIG. 4C below. The output of video event segmentation 408 is stored in the video event store 410.

The events and event metadata are used to perform video metadata alignment 416, in which events are annotated with semantically meaningful information relevant to the event. This process is described with respect to FIG. 4D below. The intervening step of feature extraction 414 is also described with respect to FIG. 4D. The annotations metadata to events generated using video metadata alignment 416 are stored in the annotated event store 316.

According to another embodiment, event airing detection 314 could be performed by a separate entity, such as a content provider or owner, e.g., which does not want to release the video content to others. In this embodiment, the identification server 130 would provide software, including the software modules and engines described herein, to the separate entity to allow them to perform these processes on the raw time-based media. The separate entity in return could provide the server 130 with the extracted features, video events, and their respective metadata for use by the server 130. These data exchanges could take place via API 202 exposed to the separate entity via web server 200.

Video Event Segmentation

Figure 4C:
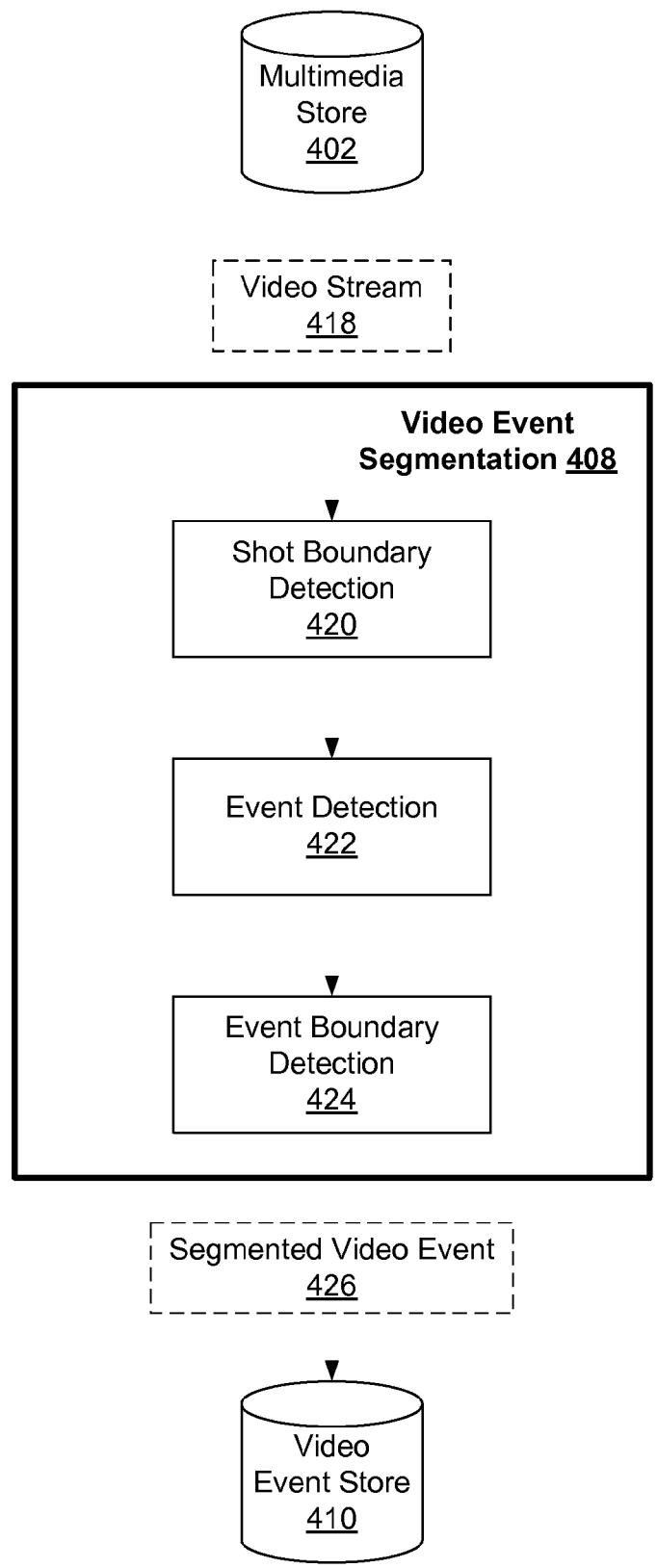
FIG. 4C is a block diagram and flowchart illustrating one embodiment of a video event segmentation process.

FIG. 4C is a block diagram and flowchart illustrating one embodiment of a video event segmentation process. As described above, video event segmentation 408 segments time-based media into semantically meaningful segments corresponding to discrete portions or "events," Input to the video event segmentation process 408 is a video stream 418 from the multimedia store 402. Video event segmentation 408 may include shot boundary detection 420, event detection 422, and event boundary determination 424, each of which is described in greater detail below. The output of video event segmentation 408 is an event 426, which is stored in the video event store 410.

Shot Boundary Detection

The first step in segmenting is shot boundary detection 420 for discrete segments (or "shots") within a video. Shot boundaries are points of non-continuity in the video, e.g., associated with a change in a camera angle or scene. Shot boundaries may be determined by comparing color histograms of adjacent video frames and applying a threshold to that difference. Shot boundaries may be determined to exist wherever the difference in the color histograms of adjacent frames exceeds this threshold. Many techniques are known in the art for shot boundary detection. One exemplary algorithm is described in Tardini et al., *Shot Detection and Motion Analysis for Automatic MPEG-7 Annotation of Sports Videos,* 13th International Conference on Image Analysis and Processing (November 2005). Other techniques for shot boundary detection 420 may be used as well, such as using motion features. Another known technique is described in A. Jacobs, et al., *Automatic shot boundary detection combining color, edge, and motion features of adjacent frames,* Center for Computing Technologies, Bremen, Germany (2004).

Event Detection

Event detection 422 identifies the presence of an event in a stream of (one or more) segments using various features corresponding, for example, to the image, audio, and/or camera motion for a given segment. A classifier using such features may be optimized by hand or trained using machine learning techniques such as those implemented in the WEKA machine learning package described in Witten, I. and Frank, E., *Data Mining: Practical machine learning tools and techniques* (2nd Edition), Morgan Kaufmann, San Francisco, Calif. (June 2005). The event detection process 420 details may vary by domain.

Image features are features generated from individual frames within a video. They include low level and higher level features based on those pixel values. Image features include, but are not limited to, color distributions, texture measurements, entropy, motion, detection of lines, detection of faces, presence of all black frames, graphics detection, aspect ratio, and shot boundaries.

Speech and audio features describe information extracted from the audio and closed captioning streams. Audio features are based on the presence of music, cheering, excited speech, silence, detection of volume change, presence/absence of closed captioning, etc. According to one embodiment, these features are detected using boosted decision trees. Classification operates on a sequence of overlapping frames (e.g., 30 ms overlap) extracted from the audio stream. For each frame, a feature vector is computed using Mel-frequency cepstral coefficients (MFCCs), as well as energy, the number of zero crossings, spectral entropy, and relative power between different frequency bands. The classifier is applied to each frame, producing a sequence of class labels. These labels are then smoothed using a dynamic programming cost minimization algorithm, similar to those used in hidden Markov models.

In addition to audio features, features may be extracted from the words or phrases spoken by narrators and/or announcers. From a domain specific ontology (not shown), a predetermined list of words and phrases is selected and the speech stream is monitored for the utterance of such terms. A feature vector representation is created in which the value of each element represents the number of times a specific word from the list was uttered. The presence of such terms in the feature vector correlates with the occurrence of an event associated with the predetermined list of words. For example, the uttering of the phrase "Travelocity" is correlated with the occurrence of an advertisement for Travelocity.

Unlike image and audio features, camera motion features represent more precise information about the actions occurring in a video. The camera acts as a stand in for a viewer's focus. As actions occur in a video, the camera moves to follow it; this camera motion thus mirrors the actions themselves, providing informative features for event identification. Like shot boundary detection, there are various methods for detecting the motion of the camera in a video (i.e., the amount it pans left to right, tilts up and down, and zooms in and out). One exemplary system is described in Bouthemy, P., et al., *A unified approach to shot change detection and camera motion characterization*, IEEE Trans. on Circuits and Systems for Video Technology, 9(7) (October 1999); this system computes the camera motion using the parameters of a two-dimensional affine model to fit every pair of sequential frames in a video. According to one embodiment, a 15-state first-order hidden Markov model is used, implemented with the Graphical Modeling Toolkit, and then the output of the Bouthemy is output into a stream of clustered characteristic camera motions (e.g., state 12 clusters together motions of zooming in fast while panning slightly left).

Event Boundary Determination

Once a segment of video is determined to contain the occurrence of an event, the beginning and ending boundaries of that event must be determined 424. In some cases, the shot boundaries determined in 410 are estimates of the beginning and end of an event. The estimates can be improved as well by exploiting additional features of the video and audio streams to further refine the boundaries of video segments. Event boundary determination 424 may be performed using a classifier that may be optimized by hand or using supervised learning techniques. The classifier may make decisions based on a set of rules applied to a feature vector representation of the data. The features used to represent video overlap with those used in the previous processes. Events have beginning and end points (or offsets), and those boundaries may be determined based on the presence/absence of black frames, shot boundaries, aspect ratio changes, etc., and have a confidence measure associated with the segmentation. The result of event boundary determination 424 (concluding video event segmentation 408) is a (set of) segmented video event 426 that is stored in the video event store 410.

Video Metadata Alignment

Figure 4D:
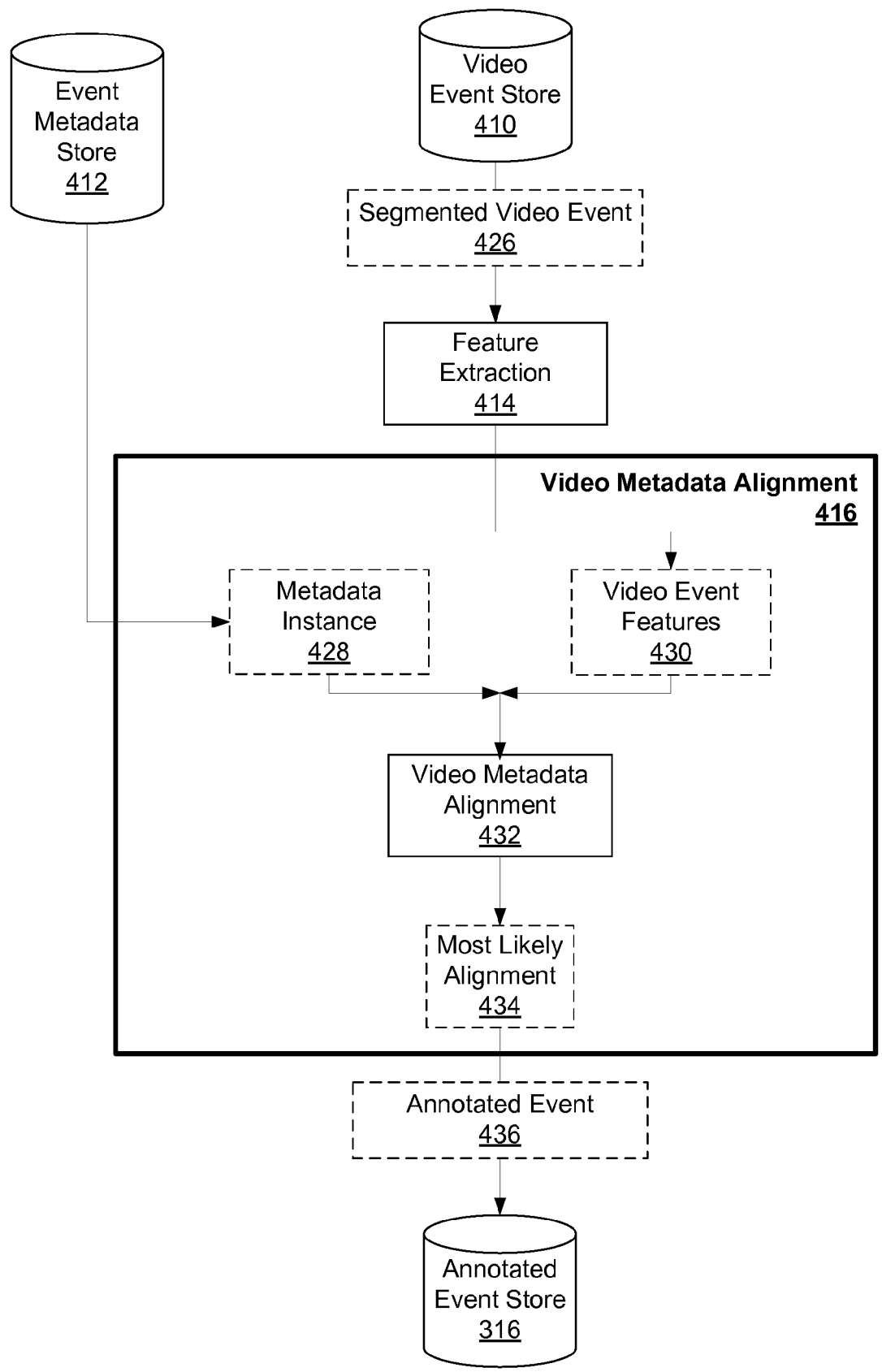
FIG. 4D is a block diagram and flowchart illustrating one embodiment of video event to metadata alignment.

FIG. 4D is a block diagram and flowchart illustrating one embodiment of video event to metadata alignment. As described above, the video metadata alignment 416 process produces annotations of the events from video event segmentation 408, where annotations include semantically meaningful information regarding the event. Video metadata alignment 416 includes feature extraction 414 and video metadata alignment 432.

Video Feature Extraction

For any given event that is to be aligned with metadata, the event is converted into a feature vector representation via feature extraction 414. Video events 426 are retrieved from the video event store 410. Output from feature extraction 414 is a video event feature representation 430. Features may be identical to (or a subset of) the image/audio properties discussed above for metadata as stored in the event metadata store 412, and may vary by domain (e.g., television, radio, TV show, advertisement, sitcom, sports show).

Video Metadata Alignment

Video metadata alignment 416 takes as input the feature vector representation 430 of an event and an instance of metadata 428. Metadata instances are metadata corresponding to a single event. Video metadata alignment cycles through each metadata instance 428 in the event metadata store 412 and uses an alignment function to estimate the likelihood that a particular event may be described by a particular metadata instance for an event. The alignment function may be a simple cosign similarity function that compares the feature representation 430 of the event to the low level properties described in the metadata instance 428.

When all metadata instances 429 in the event metadata store 412 corresponding to the event have been examined, if the most likely alignment 434 (i.e., alignment with the highest probability or score) passes a threshold, the event associated with the feature representation 430 is annotated with the metadata instance 428 and the resulting annotated event 436 is stored in the annotated event store 316 along with a score describing the confidence of the annotation. If no event passes the threshold, the event is marked as not annotated. In order to set this threshold, a set of results from the process is hand annotated into two categories: correct and incorrect results. Cross-validation may then be used to find the threshold that maximizes the precision/recall of the system over the manually annotated result set.

Social Media/Event Alignment

Figure 5:
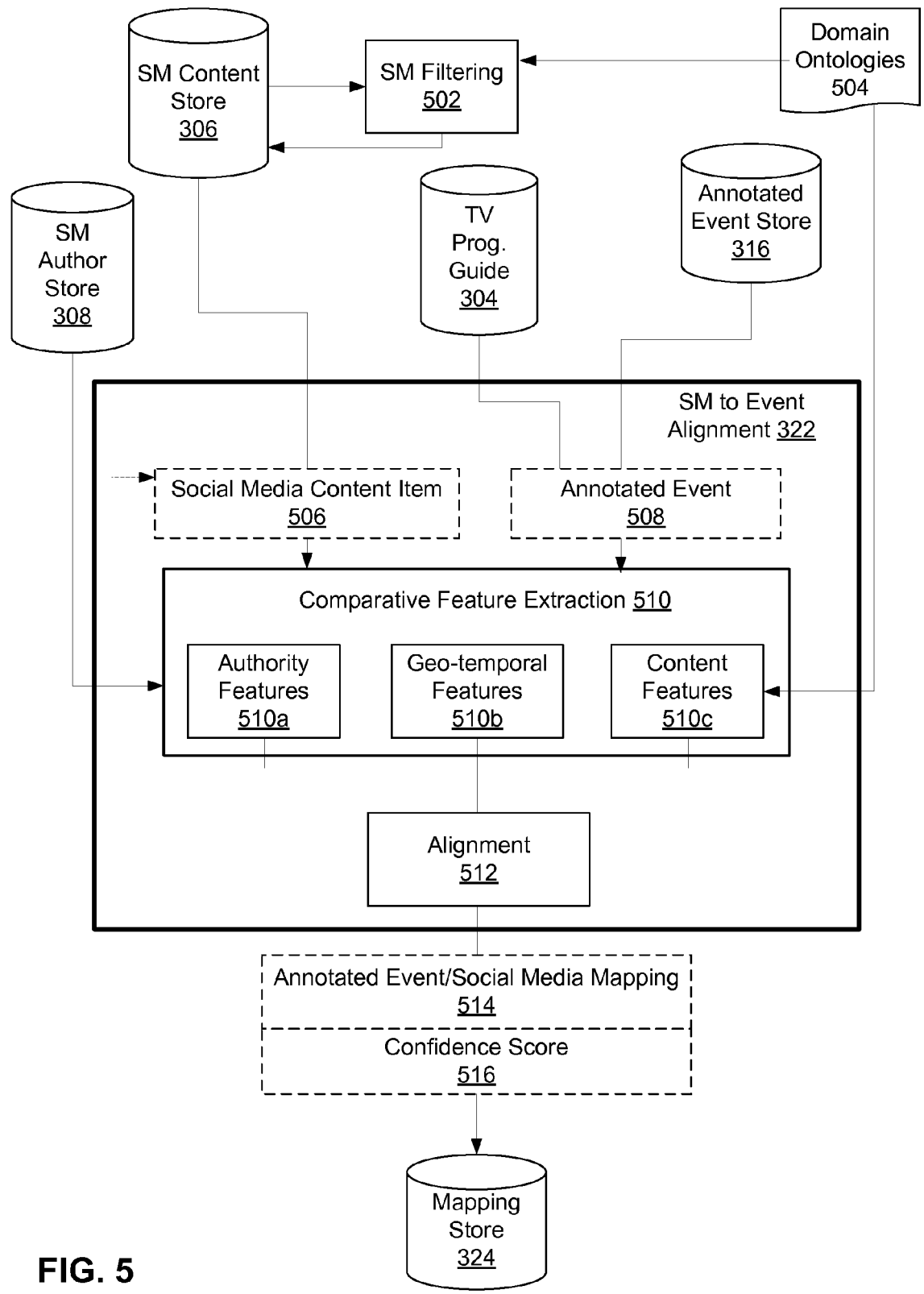
FIG. 5 is a block diagram and flowchart illustrating one embodiment of social media to event alignment.

FIG. 5 is a block diagram and flowchart illustrating one embodiment of SM to event alignment. SM to event alignment 322 aligns (or maps) the annotated events with SM content items authored by SM users. The annotated events are drawn from the annotated event store 316, as well as from TV programming guide data 304.

Similarly to the annotated events 304 in the annotated event store 316, the TV programming guide data 304 store as a set of mappings between metadata (e.g. TV show and advertisement names, casts, characters, genres, episode descriptions, etc.) and specific airing information (e.g. time, time zone, channel, network, geographic region, etc.).

SM content items generally contain content created or added by an authoring SM user. SM content items include long form and short form items such as posts, videos, photos, links, status updates, blog entries, tweets, and the like. Other examples of SM content items include audio of commentators on, or participants of, another event or topic (e.g., announcers on TV or radio) and text transcriptions thereof (generated manually or automatically), event-related information (e.g., recipes, instructions, scripts, etc.), statistical data (e.g., sports statistics or financial data streams), news articles, and media usage statistics (e.g., user behavior such as viewing, rewind, pausing, etc.).

Filtering

In one embodiment SM filtering 502 prior to SM to event alignment 322. SM content items are filtered 502 in order to create a set of candidate content items with a high likelihood that they are relevant to a specific event. For example, content items can be relevant to an event if they include a reference to the event. To perform filtering 502, a candidate set of content items is compiled based on the likelihood that those content items are relevant to the events, for example, by including at least one reference to a specific event. A comparative feature extraction engine 510 is one mechanism for doing this, and is described with respect to SM to event alignment 322.

At the simplest, this candidate set of content items can be the result of filtering 502 associated with a given time frame of the event in question. Temporal filters often are, however, far too general, as many content items will only coincidentally co-occur in time with a given event. In addition, for broadcast television, e.g., the increasing use of digital video recorders has broadened significantly the relevant timeframe for events.

Additional filters 502 are applied based on terms used in the content item's text content (e.g., actual texts or extracted text from closed caption or audio) that appear in the metadata for an event. Additional filters may also include domain specific terms from domain ontologies 504. For example, content item of a social network posting of "Touchdown Brady! Go Patriots" has a high probability that it refers to an event in a Patriots football game due to the use of the player name, team name, and play name, and this content item would be relevant to the event. In another example, a content item of a post "I love that Walmart commercial" has a high probability that it refers to an advertisement event for Walmart due to the use of the store name, and the term "commercial," and thus would likewise be relevant to this event.

A SM content item can be relevant to an event without necessarily including a direct textual reference to the event. Various information retrieval and scoring methods can be applied to the content items to determine relevancy, based on set-theoretic (e.g., Boolean search), algebraic (e.g., vector space models, neural networks, latent semantic analysis), or probabilistic models (e.g., binary independence, or language models), and the like.

SM content items that do not pass certain of these initial filters, e.g., temporal or content filters, are removed from further processing, reducing the number of mappings that occur in the latter steps. The output of SM filtering 502 is an updated SM content store 306, which indicates, for each content item, whether that content item was filtered by temporal or content filters. Additional filters may apply in additional domains.

Social Media to Event Alignment

SM to annotated event alignment 322 includes a comparative feature extraction 510 and an alignment function 512. The comparative feature extraction 510 converts input of an annotated event 508 (and/or events stored in the TV programming guide data 304) and a SM content item 506 into a feature vector representation, which is then input to the alignment function 512. The alignment function uses the received features to create a relationship between the event features and SM features. The relationship may be co-occurrence, correlation, or other relationships as described herein. The comparative feature extraction 510 also may receive input from the SM author store 308 and the domain ontologies 504. The three major types of features extracted are content features 510*c*, geo-temporal features 510*b*, and authority features 510*a*.

Content features 510*c* refer to co-occurring information within the content of the SM content items and the metadata for the video events, e.g., terms that exist both in the content item and in the metadata for the video event. Domain ontologies 504 may be used to expand the set of terms used when generating content features.

Geo-temporal features 510*b* refer to the difference in location (e.g., geographic region of airing) and time at which the input media was generated from a location associated with the SM content item about the event. Such information is useful as the relevance of SM to an event is often inversely correlated with the distance from the event (in time and space) that the media was produced. In other words, SM relevant to an event is often produced during or soon after that event, and sometimes by people at or near the event (e.g., a sporting event) or exposed to it (e.g., within broadcast area for television-based event).

For video events, geo-temporal information can be determined based on the location and/or time zone of the event or broadcast of the event, the time it started, the offset in the video that the start of the event is determined, the channel on which it was broadcast. For SM, geo-temporal information can be part of the content of the media itself (e.g., a time stamp on a blog entry or status update) or as metadata of the media or its author.

The temporal features describe the difference in time between when the SM content item was created from the time that the event itself took place. In general, smaller differences in time of production are indicative of more confident alignments. Such differences can be passed through a sigmoid function such that as the difference in time increases, the probability of alignment decreases, but plateaus at a certain point. The parameters of this function may be tuned based on an annotated verification data set. The spatial features describe the distance from the author of the content item location relative to the geographical area of the event or broadcast. Spatial differences are less indicative because often times people comment on events that take place far from their location. A sigmoid function may be used to model this relationship as well, although parameters are tuned based on different held out data.

Authority features 510*a* describe information related to the author of the SM and help to increase the confidence that a SM content item refers to a video event. The probability that any ambiguous post refers to a particular event is dependent upon the prior probability that the author would post about a similar type of event (e.g., a basketball game for an author who has posted content about prior basketball games). The prior probability can be approximated based on a number of features including: the author's self-generated user profile (e.g., mentions of a brand, team, etc.), the author's previous content items (e.g., about similar or related events), and the author's friends (e.g., their content contributions, profiles, etc.). These prior probability features may be used as features for the mapping function.

The alignment function 512 takes the set of extracted features 510*a-c* and outputs a mapping 514 and a confidence score 516 representing the confidence that the SM content item refers (or references) to the video event. For each feature type 510*a-c*, a feature specific sub-function generates a score indicating whether the SM content item refers to the annotated event. Each sub-function's score is based only on the information extracted in that particular feature set. The scores for each sub-function may then be combined using a weighted sum, in order to output a mapping 514 and an associated confidence score 516, as shown below for an event x and a SM content item y:

$$\text{align}(\text{feat}(x,y)) = [\alpha \cdot \text{content}(\text{feat}(x,y))] + [\beta \cdot \text{geoTemp}(\text{feat}(x,y))] + [\gamma \cdot \text{author}(\text{feat}(x,y))]$$

where α, β, and γ are the respective weights applied to the three feature types, and align(feat(x,y)) is the confidence score. Both the weights in the weighted sum, as well as the sub-functions themselves may be trained using supervised learning methods, or optimized by hand. The output of the SM to event alignment 332 is a mapping between an annotated event and a SM content item. This mapping, along with the real-value confidence score is stored in the mapping store 324.

Social Media to Identity Alignment

The alignments 332 between SM content items and events may be translated into alignments between SM IDs and events. In one embodiment, a total confidence score may be determined that represents the confidence that an event is relevant to an SM ID. This total confidence score may be interpreted as the likelihood that the event (e.g., a television program or commercial) has been viewed by the user associated with the SM ID. The total confidence score may be determined using a function incorporating the confidence scores, determined using alignment 332, between SM content items authored by the SM ID and the event. For example, the function may sum these individual confidence scores.

Social Media to Topic Alignment

The alignment process 322 described in FIG. 5, including filtering 502, may used outside of the context of social media content item to event alignment. For example, alignment process 322 may be used to align social media content items with keyword topics or interests provided by a third party source, such as an advertiser 160. This may be useful if an advertiser 160 is interested in determining whether a given SM ID is interested in a given topic.

To align a topic with SM content items, either the identification server 130 may create, or alternatively the advertiser 160 may provide, keywords associated with a topic to the identification server 130. The identification server 130 may perform the alignment process 322 using these keywords to perform comparative feature extraction 510 on the SM content items. The extracted features and keywords may then be aligned 512 to identify SM content items associated with the keywords. A confidence score may be determined regarding the alignment between the one or more keywords and the SM content item. As immediately above, the identification server may also identify the authors of SM content items. To align SM IDs with topics, the individual confidence scores of SM content items authored by the user may be aggregated. A total confidence score that a user is aligned with a topic may be determined based on the individual confidence scores of the SM content items authored by that user. The identification server 130 may store (not shown) and output the SM IDs associated with a given topic by returning the SM IDs aligned with the topic based on their respective total confidence scores.

There are a wide variety of possible topics. Examples include general categories such as politics, sports, and fashion, specific personalities such as Justin Bieber or Joss Whedon, or specific brands such as Harley Davidson Motorcycles and Porsche cars. Generally, anything may be a topic, and any other word or set of words may be used as a keyword associated with a topic. A keyword may include a single words, or a series of words, such as a phrase.

For example, if an advertiser 160 wants to determine whether a user is a pet owner (as one example of a topic), the identification server 130 may use keywords commonly associated with being a pet owner to determine whether the user is a pet owner. These keywords might include, for example, "my dog", "my cat", "my kitten", "our dog", "our puppy", and so on. The SM content items authored by a given SM ID may contain an example SM content item stating "My dog slobbered all over the couch!". Comparative feature extraction 510 may extract several features from this content item based on the presence of several of the keywords in the example SM content item. An example of a feature in this SM content item may include "my dog." Consequently, alignment 512 may indicate that there is a high level of confidence (e.g., a high confidence score) that the SM content item is associated with the topic of being a pet owner. Based on this and other SM content items authored by the SM ID, a total confidence score may be determined regarding whether the SM ID is aligned with the pet owner topic.

Advertising Time Based Media Event Example

As described in conjunction with FIG. 4B, multiples streams of data are ingested as a preliminary step in the method.

Video Event Segmentation

For the advertising domain, during the video event segmentation 408 process, the time-based media is segmented into semantically meaningful segments corresponding to discrete "events" which are identified with advertisements (i.e. commercials).

Event detection 422 in the advertising domain may operate by identifying one or more shots that may be part of an advertisement. Advertisements can be detected using image features such as the presence of all black frames, graphics detection (e.g. presence of a channel logo in the frame), aspect ratio, shot boundaries, etc. Speech/audio features may be used including detection of volume change, and the presence/absence of closed captioning.

Event boundary detection 424 operates on an advertisement block and identifies the beginning and ending boundaries of individual ads within the block. Event boundary determination may be performed using a classifier based on features such as the presence/absence of black frames, shot boundaries, aspect ratio changes, typical/expected length of advertisements. Classifiers may be optimized by hand or using machine learning techniques.

Video Metadata Alignment

As with event segmentation 408, the video metadata alignment 416 process is domain dependent. In the advertisement domain, metadata for an advertisement may include information such as "Brand: Walmart, Scene: father dresses up as clown, Mood: comic." This metadata is generated by human annotators who watch sample ad events and log metadata for ads, including, the key products/brands involved in the ad, the mood of the ad, the story/creative aspects of the ad, the actors/celebrities in the ad, etc.

Metadata for advertisements may also include low level image and audio properties of the ad (e.g. number and length of shots, average color histograms of each shot, power levels of the audio, etc.).

For each event (e.g., advertisement) that is to be aligned with metadata, the advertisement is converted into a feature vector representation via feature extraction 414. Video metadata alignment 432 then takes as input the feature vector representation 430 of an advertisement and a metadata instance 428. It cycles through each metadata instance 428 in the event metadata store 412 and estimates the likelihood that the particular advertisement may be described by a particular metadata instance using, for example, a simple cosign similarity function that compares the low level feature representation of the ad event to the low level properties in the metadata.

The particular start and end times, channel and location in which the specific advertisement appeared is included with the metadata that is stored in the Annotated Event Store 316.

Social Media to Event Alignment

Generally, SM to event alignment 322 generates geo-temporal features, content features, and authority features. Content feature representations express the amount of co-occurring content between television show or advertisement metadata, as stored in the TV programming guide data 304 and annotated event store 316, and terms within SM content items. For example, the content item "I loved this Glee episode. Can you believe what Quinn just did" and the metadata for the television show "Glee": {"Show: Glee; Cast: Dianne Agron, Chris Colfer, etc.; Characters: Quinn, Kurt, etc.; Description: In this episode . . . "} have co-occurring (e.g., matching) content terms (e.g., "Glee" and "Quinn"). In another example, the content item "I loved that hilarious Walmart clown commercial" and the metadata for an advertisement for Walmart {"Brand: Walmart, Scene: father dresses up as clown, Mood: comic"} have co-occurring content terms (e.g., "Walmart" and "clown"). The matches may be considered generally, so that content appearing anywhere in a SM message can be matched against any terms or elements of the television show or advertisement metadata, or may be restricted to certain sub-parts thereof.

In addition to exact matches, the domain ontologies 504 that encode information relevant the television show and/or advertising domain may be used to expand the term set to include synonyms and hypernyms (e.g., "hilarious" for "comic"), names of companies, products, stores, etc., as well as TV show associated words (e.g., "episode") and advertisement associated words (e.g., "commercial").

The output of SM to event alignment 322 is a mapping between the annotated TV show or advertisement and each SM content item, with an associated confidence score. This information is stored in the mapping store 324.

TV Show to Advertisement Overlap

The TV show to advertisement overlap 318 engine creates mappings between the detected airings of advertisements and the TV shows in which those airings occurred. Put another way, TV show to advertisement overlap 318 engine determines which advertisements aired during which TV shows. Similarly to the SM to event alignment 322, TV show to advertisement overlap 318 accesses annotated events from the annotated events store 316 and the TV programming guide 304 data, and uses this information to determine the overlap of airings between advertisements and other types of time-based media.

To determine the overlap of airings of TV shows and advertisements, the engine 318 is configured to compare the temporal extent of the airing times of the TV shows and advertisements. If an advertisement airs between the total temporal extent of the TV show, the airing advertisement is determined to match (or overlap) the airing of the TV show. When an airing of an advertisement occurs on the same channel, in the same TV market, and within the same airing time window as a TV show, a mapping indicative of this occurrence is stored in the TV show/ad overlap store 320 by the engine 318. For example, a mapping may be created between an ad for laundry detergent airing at 7:15 pm PST on FOX™ on Comcast™ cable and an episode of the TV show Glee from 7:00 pm to 8:00 pm PST, also on FOX™ on Comcast™ cable.

Web Identity to Social Media Identity Alignment

A web ID to SM ID 326 engine correlates the web browsing behavior of individuals with their use of SM systems to identify (or map or align) the user's web ID to their SM ID. A given web ID may be mapped to one or more SM IDs, and a given SM ID may be mapped to one or more web IDs.

In one embodiment, the web ID to SM ID alignment 326 engine receives input from a SM content store 306 containing SM content items, a SM author store 308 containing the SM IDs of the user who authored each SM content item from the SM content store 306.

The web ID to SM ID alignment 326 engine also receives input from a cookie store 310 and a web ID store 312. The cookie store 310 stores cookies (or HTTP cookies, web cookies, or browser cookies) containing text regarding the behavior of a web ID on the internet. The behavior stored in a cookie may include a list of websites visited, times when the websites were visited, website authentication information, user preference information for the browser generally or for specific websites, shopping cart content, or any other textual information. The cookies stored in cookie store 310 may be received by the identification server from any one of a number of different sources, including any of the systems described with respect to FIG. 3. The list of web IDs of the cookies in store 310 may be separately stored in a web ID store 312.

Figure 6:
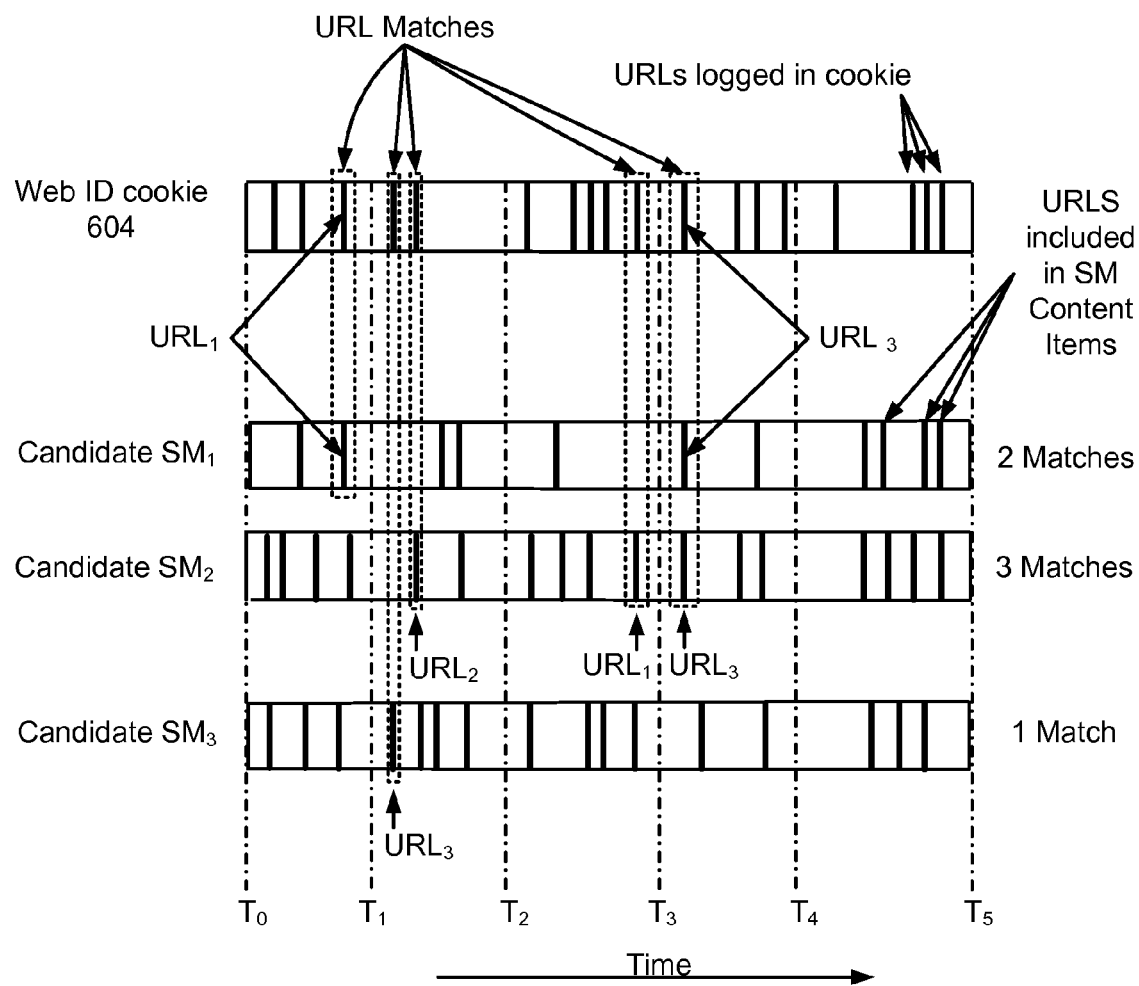
FIG. 6 is an illustration of one embodiment of web identity to social media identity alignment.

FIG. 6 is an illustration of one embodiment of web ID to SM ID alignment 326. In this embodiment, a web user's ID is matched with one or more SM IDs by matching uniform resource locators (URLs) that appear in tracking cookies and also in SM content items, and by also matching the times that those URLs appear.

To determine the SM IDs correlated with a given web ID, one or more cookies storing the website URL browsing behavior of a single web ID is used as a baseline to compare against the SM content items stored in the SM content store 306. The SM content items used in the matching each contain at least one URL link. The exact manner in which URLs and times in the cookie/s and the SM content items are compared may vary depending upon the implementation.

In the example embodiment of FIG. 6, the SM content items are time indexed. The time index contains a number of time bins, where each bin covers a distinct, non-overlapping time range (e.g., one hour periods). The SM content items are added to the time bins depending upon when they were authored (e.g., the date and time when they were posted to a social networking system). Each entry in one of the time bins of the time index may, for example, include two values, a value indicating the SM ID of the user who authored the SM content item, and the URL or URLs contained in the SM content item. In one embodiment, the entries in a given bin are arranged in reverse chronological order.

The comparison is performed by taking each URL in a cookie, examining the time that the URL was visited, and comparing that time against the time index to match a particular time bin. Then, searching within that time bin, the URL from the cookie is compared against the URLs of the SM content items in the time bin. If the URL from the cookie matches a URL from a SM content item in the time bin, then it is determined that there is an instance of a match between the web ID of the cookie and the SM ID of the matching content item. This process may be repeated for each URL in the web cookie, against the SM content items in each matching time bin.

Basing the alignment between web IDs and SM IDs on the comparison above relies on the assumption that if a user authors a SM content item containing a URL link to a website on the internet, then it is assumed that the user likely visited that URL using a web browser near in time to when they authored the SM content item. While this assumption is not expected to be true in every single instance, it is assumed to be generally true in many cases.

A single match between a SM ID and a web ID does not necessarily guarantee that the SM ID is definitively correlated with the web ID. Even multiple matches may not guarantee correlation. However, the greater the number of matches that are detected between a web ID and a SM ID, the more likely it is that the two are correlated.

Given that the correlation is not necessarily guaranteed, the alignment 326 between a web ID and SM IDs may be expressed as a list of all SM IDs that contain at least a threshold number of matches to the web ID. Further, each web ID to SM ID alignment may be represented as a confidence value. The more matches between a web ID and a SM ID, the greater the confidence value. The confidence may be determined as any numerical value (e.g., ranks, probabilities, percentages, real number values). Confidence values may also be normalized, for example using the confidence values of the other SM IDs in the list.

The contribution that a match makes to the confidence value may be a fixed value, such that each match between URLs in SM content items and URLs in a cookie contributes the same amount as any other match. Alternatively, the contribution a match makes to the confidence value may vary depending upon the popularity of the website. For example, if a website is very rarely visited, then a match to a shared link in a SM content item may increase the confidence value a larger amount versus the contribution of a match of a very commonly visited website. Contributions of matches to the confidence value may also vary depending upon other factors including, for example, the time of day of the match, and the number of simultaneous visitors (i.e., density of visitors) at a given URL at the time of the match.

FIG. 6 illustrates an example alignment between three example candidate SM users 1, 2, and 3, versus a single example web ID cookie 604. The cookie and content items as temporal extents from $T_0$ to $T_5$ are represented by the rectangular boxes, and the appearance of a URL at a particular time is represented by an dark vertical mark. Candidate user $SM_1$ matches the web ID cookie 604 twice (for $URL_1$ and $URL_3$), candidate user $SM_2$ matches the web ID cookie 604 three times (for $URL_1$, $URL_2$ and $URL_3$), and candidate user $SM_3$ matches the web ID cookie 604 only once ($URL_3$). As a result, candidate SM user 2 has the highest confidence as being the same user from web ID cookie 604, candidate SM user 1 has the second highest confidence, and candidate SM user 3 has the lowest confidence. The matches for all three candidate SM users are displayed in a single time index 62 at the top of FIG. 6, illustrating how an example time index may be structured. In practice, the time index may contain all SM content items under consideration, not just the matches, but for clarity of the example only matches are shown.

The manner in which URLs are matched may vary depending upon the implementation. As URLs may contain a great deal of information, the portion of the URL that is used to match will affect how many other URLs match that URL. On average, if the entire URL string is matched, less matches will be determined than if URLs are truncated prior to matching. Truncation may be used on either (or both) of SM content item URLs and website URLs to match any portion of each URL. For example, a URL in a cookie may be, in its entirety, "http://forum.site.com/showthread.php ?4819133-myThread/page51." Truncation may be used to match "http://forum.site.com/showthread.php?4819133-myThread/" or "http://forum.site.com/". Truncation of URLs may be fixed in advance, adjusted dynamically, or externally controlled as an input to the matching process. Truncation thus may act as a tunable parameter that widens or narrows the scope of a potential match. More truncation will result, generally, in more matches and higher confidence values, where as less truncation will result, generally, in fewer matches and lower confidence values.

In addition to truncation, the web ID to SM ID alignment process 326 may also be configured to expand shortened URLs to create expanded URLs for use in matching. For example, a content item may contain a URL that has been shortened using a website such as Bit.ly™. The original URL prior to shortening may be of the form "http://forum.site.com/showthread.php ?4819133-myThread/page51." The shortened version may be contained in a SM content item or cookie as http://bit.ly/JLzAzK. The expanded URLs may then be used in matching in place of, or in addition to, the shortened URLs.

The scope of URL matching may further be controlled by abstracting URLs into a general type prior to matching. Once URLs have been abstracted to types, matching is performed by comparing the types of the cookie URLs to the types of SM content item URLs. For example, a URL in a cookie may be for www.espn.com. This may be abstracted to be a URL of type SPORTS-SITE. A URL in a content item may be for www.ncaa.org. This URL may also be abstracted to be a URL of type SPORTS-SITE. Without performing abstraction, these two URLs would generally not match. However, if both URLs are abstracted to the same type, then they will match in process 326, thereby increasing the confidence value that a given web ID and SM ID are the same person. Generally, abstraction lowers the threshold for matching between URLs, and as a consequence more matches will be detected if abstraction performed prior to matching than if it is not. Although only a SPORTS-SITE type of abstraction has mentioned above, an infinite number of types are possible, including, for example, NEWS, POLITICS, BUSINESS, SCIENCE, HEALTH, ARTS, INTERESTS, CARS, STYLE, etc.

The manner in which times are matched may also be controlled. For example, the time range covered by each time bin in the time index may be adjusted to control how close in time SM content items must be authored to the time when websites are visited in order to generate a match. On average, increasing the time range covered by a bin in the time index increases the amount of time needed to find matches, assuming that size of bin is related to match time. As with truncation, time ranges may be fixed in advance, dynamically adjusted, or externally controlled as an input to the matching process.

Although the web ID to SM ID alignment 326 has been described above in terms of indexing SM content items and matching the web cookie against those SM content items, the alignment 326 may also be performed in reverse. For example, web cookies may be indexed, and the SM content items authored by a SM ID could be compared against those cookies. Additionally, alignment 326 has been described in terms of indexing based on time in order to facilitate URL matching. Indexing may also be performed by URL to facilitate time matching.

As described above, the web ID to SM ID 326 engine correlates the web browsing behavior of individuals with their use of SM systems to map the user's web ID to their SM ID. In one embodiment, rather than matching web IDs against individual SM IDs, the engine 326 maps web IDs against a model user constructed to represent a group of SM IDs who share one or more traits. In this case, rather than trying to correlate the web ID of a user with the SM ID of that same user, the engine 326 is instead determining whether the user of a given web ID matches the kind of person represented by a model.

In one implementation, a model user is constructed by aggregating together all of the SM IDs of users who are known to have certain specified traits (e.g., interests, hobbies, activities, characteristics, television viewing habits, brand affinities). These traits may be extracted directly from SM content items associated with each SM ID. In constructing the model user, the model user may be associated with all of the SM IDs that have a SM content item indicating that the user of the SM ID shares the specified trait. The model user may also be associated with all the of the SM content items of all of the SM IDs that share the specified trait. As a result, the model user is similar to any other SM ID in that both have associated SM content items that may be used for matching.

To determine whether a web ID matches a model user, the web ID to SM ID 326 engine performs the same matching process as described above, except that in this case the model user is substituted in place of a SM ID. During the matching process the URLs and times of the cookie/s associated with the web ID are compared against the URLs and times from the SM content items associated with the model user. As with SM IDs, a confidence value may be determined that a web ID matches a model user.

An example of a model user may be a model user who has the trait of being a Joss Whedon fan. The model user may be constructed to include all SM IDs who have expressed interest in Joss Whedon directly, or any of the projects he has worked on (e.g., Dr. Horrible's Sing-Along Blog, Firefly). If one or more of the content items of a given SM ID mentions any of the projects delineated as being associated with the trait, that SM ID may be incorporated into the model user. Web ID to model user alignment may then be performed using engine 326 to determine whether or not a user associated with a web ID is a Joss Whedon fan.

In one embodiment, rather than web ID to SM ID alignment being performed by the identification server using engine 326, web ID to SM ID alignment may instead be performed by a third party (not shown) externally. Identification server 130 may make requests for alignment from the third party, and may receive responses containing the alignments.

Example Use Cases: General Process Flow

Figure 7:
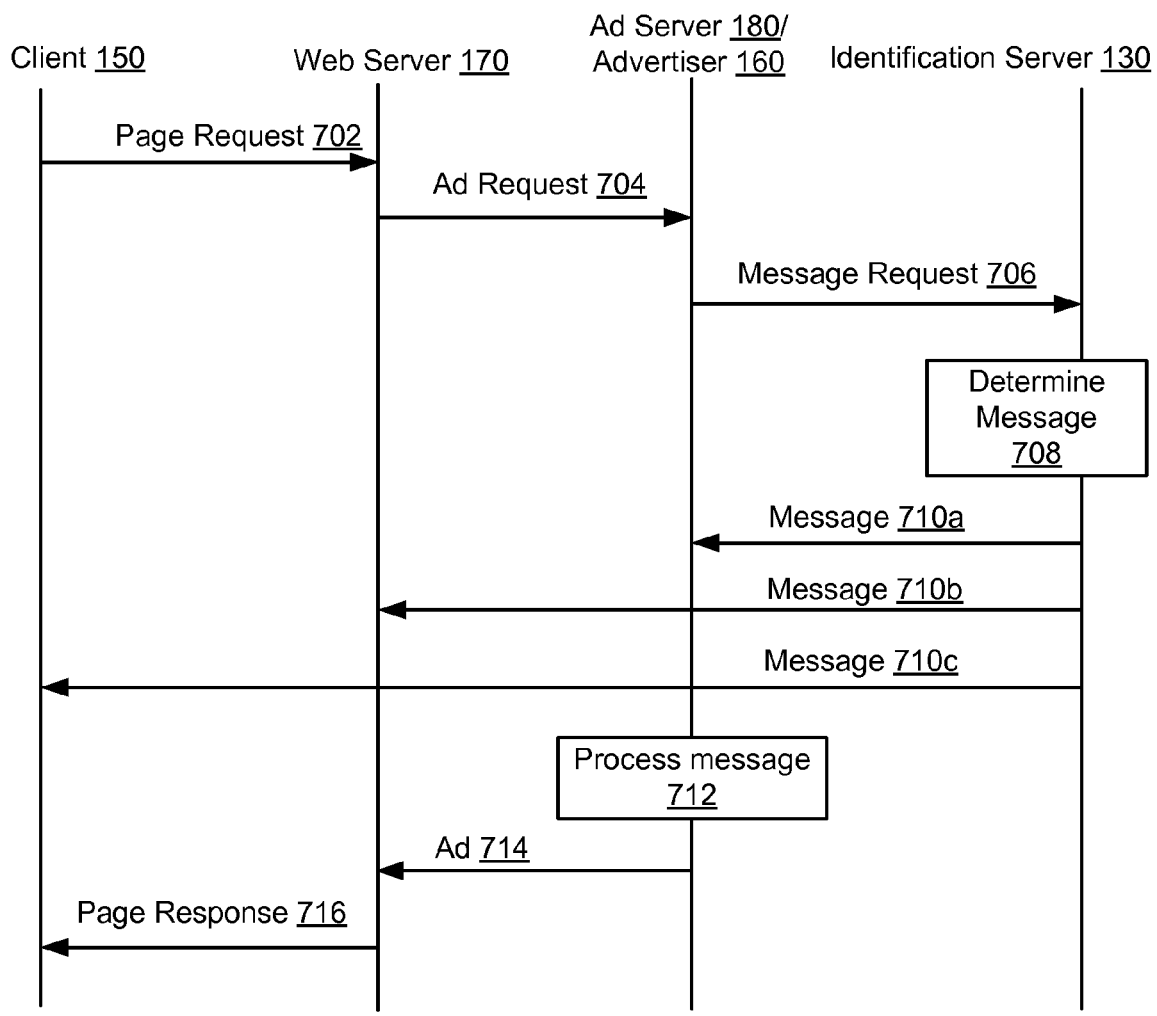
FIG. 7 is an interaction diagram for using the identification server to send messages, according to one embodiment.

FIG. 7 is an interaction diagram for using the identification server to send messages, according to one embodiment. A client device 150, operated by a user, sends 702 a web page request to a web server 170 requesting content for display in a web browser running on the client device. Although not shown, other types of similar requests 702 are also possible, for example, the request 702 may be for SM information, and the recipient of the request 702 may be a SM source 110 such as a social networking system, rather than a web server 170. The web page request 702 may also include a request for time-based media from a time-based media source 120.

The recipient of the web page request 702, in this case web server 170, retrieves the content to be returned in response 716 to the request 702. As part of the content to be returned in the page response 716, the web server 170 may also request 704 advertising content, for example, where the web page includes an advertisement placement, such as banner ad, sidebar ad, overlay ad, or the like. The web server 170 obtains the advertising content 714 using the ad request 704 from an ad server 180. In one embodiment the ad server 180 is an advertisement bidding system that allows advertisers 160 (not shown in FIG. 7) to place bids on advertisement placements in web pages. The ad server 180 interacts with one or more advertisers 160 to coordinate the purchase and display of advertisements. This is not shown as a separate step in FIG. 7, as the identification server 130 provides services to both the ad server 180 and the advertisers 160 in order to facilitate the return of advertising material 714 to the web server 170.

Ad servers 180 may send a request 706 to the identification server 130 to determine how much to charge for advertisement space to be displayed to the requesting user. Advertisers 160 may send a request 706 with identification server 130 to determine how much to bid for advertisement space to requesting user, and what advertisement to show to the requesting user. The identification server 130 responds to received requests 706 from any entity with one or more messages 710a-c, sent either separately or as part of a regularized feed. The recipient/s and contents of the message 710 vary depending upon the requestor and the contents of the message request 706. For example, in response to a request 706, a message 710a may be sent to the advertiser 160 or ad server 180, a message 710b may be sent to web server 170, or a message 710c may be sent to the client 150. Various use cases for the identification server 130, including the contents of the request 706, the recipient of the message 710, and actions performed by the identification server 130 are described further below.

In the case where a message 710a is sent to the advertiser 160 or ad server 180, the ad server 180 or advertiser 160 processes 712 the message. Processing 712 the message 710a may include, for example, determining which advertisement to send 714 to the web server 170, constructing a tailored advertisement 714 to send to the web server 170, sending an advertisement referenced or stored in the message 710 to the web server 170, and/or pricing or placing a bid on advertisement space in the page response 716. In the case where a message 710b containing an ad is sent to the web server 170 or where an ad 714 is received from the ad server 180 or advertiser 160, the web server 170 sends the ad, in both cases, to the client 150. In the case where a message 710c is sent directly to the client 150, the message 710c contains an advertisement to be presented to the user of the client 150.

The message request 706 received by the identification server 130 may include a web ID, a SM ID, a cookie, instructions for receiving targeting criteria, and tolerance parameters. The message 708 sent by the identification server 130 may include, for example, a specific advertisement to send to a specific web ID or SM ID, advertising material that the advertiser 160 may use to create an advertisement to be sent to the user, an identification of a user in terms of one or more web IDs or SM IDS, targeting criteria, and/or a listing of the time-based media events (e.g., ads, TV shows) the user is likely to have seen.

In other embodiments, the web server 170, ad server 180, advertisers 160, SM sources 110, and identification server 130 may not be separate, and functions performed by each of these entities may be combined together. For example, the identification server 130 may communicate with the web server 170, SM sources 110, or the clients directly 150.

Specific Use Cases

To determine 708 the content of the message 710, the identification server 130 is configured to use event airing detection 314, TV show to ad overlap 318, SM to event alignment 322, web ID to SM ID alignment 326 as described above. There are a number of different use cases with different inputs that affect the content of the message 710 output by the identification server 130.

Using a Web ID to Obtain Correlated SM IDS

Advertisers 160, including, for example, a social networking system 110 may want to determine whether to bid on a particular advertisement space to be presented to a user associated with a web ID. To determine whether or not to place the bid, the advertisers 160 may want to know who the user associated with the web ID is. The identification server 130 can provide this information in the form of one or more correlated SM IDs of the user. Alternatively, advertisers 160 may wish to tailor advertisements to be sent to a specific user associated with particular web ID. The advertiser 160 may request SM IDs correlated with a given web ID to determine what advertising content will be sent to the user associated with the web ID.

To do this, in one embodiment, the identification server 130 receives a request 706 containing a cookie and a web ID, and requesting one or more SM IDs corresponding to the web ID. The advertiser 160 may, for example, use the return SM IDs to determine what advertisement to send to the user. The identification server 130 uses the received web ID and the cookie to perform web ID to SM ID alignment 326. Based on the results of the alignment 326, the identification server 130 responds with a message 710 comprising one or more SM IDs, as well as confidences indicative of the chance that each returned SM ID corresponds to the received web ID. As described above, web ID to SM ID alignment 326 may also return one or more model users who match a web ID. Consequently, the message 710 may also comprise one or more model users (with confidences) who match the web ID from the request.

Using a Web ID to Obtain Advertisements a User has Likely been Exposed to

The above embodiment assumes that the advertisers 160 can make use of the returned SM IDs. In some cases, the advertisers 160 may instead want to know what TV advertisements (or other time-based media) the user associated with the web ID has been exposed to. The identification server 130 can provide this information. The advertisers 160 may, again, use this information to determine what advertisements to bid on, or to tailor their advertisements to the user who will be receiving the advertisement. For example, advertisers 160 may want to send an advertisement to a user, where the advertisement sent is related to an advertisement or TV show that has aired and that the user has likely been exposed to.

To provide advertisers 160 with this information, in one embodiment the identification server 130 receives a request 706 containing a cookie and a web ID, and requesting a listing of advertisements (e.g., specific advertisements, brands, ad creatives) that the user corresponding to the web ID is likely to have seen. As above, the identification server 130 uses the web ID and the cookie to perform web ID to SM ID alignment 326.

Asynchronously with the alignment 326, the identification server also performs event airing detection 314, the TV show to ad overlap 318 process, and SM to event alignment 322. For the SM IDs correlated as a result of alignment 326, the identification server 130 obtains the events that are aligned with those SM IDs from SM to event mapping store 324. This identifies the annotated time-based media events that are correlated with the web ID. For those events, the identification server 130 obtains the advertisements that aired during those events from the TV show to ad overlap store 320. This identifies the advertisements that the user associated with the web ID is likely to have seen. The identification server 130 then responds with a message including the advertisements that the user associated with the web ID is likely to have seen, or with a message including an advertisement related to the events likely seen.

Using a Web ID to Obtain Interests of the User

In some cases, advertisers 160 may want to know whether a web ID or SM ID is interested in or associated with a particular topic. For example, given a web ID, an advertiser may wish to know whether a user is a pet owner. The identification server 130 can provide this information. The advertisers 160 may, again, use this information to determine what advertisements to bid on, or to tailor their advertisements to the user who will be receiving the advertisement. For example, advertisers 160 may want to send advertisements to users already known to be pet owners, in order to maximize the efficacy of their ad campaign.

In one embodiment, to provide advertisers 160 with this information, in one embodiment the identification server 130 receives a request 706 containing a cookie and a web ID, and a request for a determination of whether the user associated with the web ID is interested in a topic. In advance of the request 706, the advertiser 160 provides the identification server 130 with a rule, and may provide one or more keywords for assisting in the determination of whether or not a user has interest in the designated topic. Alternatively, the identification server 130 may itself determine one or more keywords to associate with a topic for the purpose of determining whether or not a user has interest in the designated topic. The identification server 130 uses the web ID and the cookie to perform web ID to SM ID alignment 326. The identification server 130 further performs SM content item to keyword alignment 322, including filtering 502, comparative feature extraction 510, and alignment 512, to determine whether the user associated with the web ID and SM ID is interested in the topic. The identification server 130 then responds with a message 710 based on the rule and the user's determined interest in the topic.

Cookies May be Stored on the Identification Server

In another embodiment, the request 706 received by the identification server 130 comprises only a web ID, and the identification server 130 uses stored cookies 310 associated with the web ID to perform web ID to SM ID alignment 326. This is beneficial as an alternative to including cookies as part of requests 706. As a consequence, advertisers 160 may more easily make requests 706 of the identification server 130 without requiring as large of an input. As there are many possible sources of cookies, this embodiment covers the case where the source of the cookie is someone other than the requestor.

Advertisers May Request Web Ids Rather than SM Ids

The above embodiments describe implementations where the requestor 706 has information regarding a user in a website browsing context (e.g., their web ID or cookies), and uses this information to obtain, from the identification server, information about the user's behavior in a social media context. The identification server is also configured to operate in the reverse situation, where the requestor has information about the user in a social media context, and requests information about the user in a website browsing context. This facilitates use of the identification server by a wider variety of possible consumers.

In one such embodiment, the request 706 includes a SM ID and/or a list of SM content items authored by the user associated with that SM ID. The identification server 130 compares the SM content items to stored cookies 310 associated with one or more stored web IDs 312 to perform web ID to SM ID alignment 326. The identification server 130 may return a message containing a list of one or more web IDs corresponding to the received SM ID, along with confidences indicative of the chance that each web ID corresponds to the received SM ID. The identification server may also return a message including the advertisements that the user associated with the received SM ID is likely to have seen previously, as above.

Requests May Include Other Inputs

The identification server 130 may also provide advertisers 160 and ad servers 180 with additional input options to control the behavior of the identification server 130. To widen or narrow the number of results returning in a message 710, a request 706 for a message may include tolerance parameters to be used as part of web ID to SM ID alignment 326. The tolerance parameters may, on average, increase or decrease the chance of a match between a SM ID and a web ID by altering the conditions for a match. The tolerance parameters may also tune the amount of time taken to perform matches during web ID to SM ID alignment 326. Examples of tolerance parameters include the extent to which URLs are truncated for matching, whether truncation or shortened URL expansion is used, and the time range covered by each bin in the time index. Other examples of tolerance parameters are also contemplated, particularly if other types of indices are used to perform matches, and/or if other items of data are used to perform the match.

The Identification Server May be Configured to Send Messages Automatically

In addition to responding to requests 706 for messages from advertisers 160 and ad servers 180, the identification server 130 may also be configured to provide messages 710 to recipients automatically. This may be useful, for example, if an advertisers wishes to send an advertisement based on the airing of one of their own advertisements during a television show. For example, an advertiser 160 may air an ad on TV, and may use the identification server 130 to tell the advertiser 160 when a related advertisement should be sent using a message 710 to users via a website browser as well. The identification server's 130 ability to detect airings of advertisements 314 on TV and notify the advertiser 160 accordingly facilitates this business strategy. Additionally, advertisers 160 may wish to be continually updated, for example using a feed, regarding other information, for example correlations between web IDs and SM IDs, or what advertisements various users have likely been exposed to.

To allow for this, in one embodiment the identification server 130 generates 708 messages 710 on its own initiative. Messages 710 may be generated 708 so as to be part of a regularized feed, or in response to the detection 314 of airing of a particular time-based media event. To determine what messages 710 to send, the identification system may store rules (not shown) for when and to whom messages 710 are to be sent. Rules are described further below.

To send a message 710 on its own initiative, the identification server 130 is configured to keeps track of the TV shows and advertisements that are currently airing or have aired. The identification server 130 may do this by monitoring information from the TV show/ad overlap store 320 as provided by event airing detection 314, and/or from the TV programming guide 304. When advertisements or TV shows are detected as having aired, message selection 330 queries for rules wherein the detected advertisements or TV shows are used in the rule. The process for the detection of airings and sending of messages 710 in response may be performed in batches one or more times per day.

If such a rule is matched, message selection 330 creates a message 710 associated with the matched rule. If more than one rule is matched, the identification server 130 may select between the possible matched rules. The selection may, for example, be based on how recently the user is expected to have seen the ad, the amount of time since a user or group of users received a message, and/or how much an advertiser associated with a rule and message paid or bid for the advertising space for that message.

Rules for Sending Messages, Either Automatically or in Response to a Request

The identification server 130 (specifically, for example, the message selection engine 330) may make use of rules to determine what messages 710 to send, when to send messages, and to whom to send messages. The use of rules allows the identification server not only to identify users, as described in the use cases above, but also to send messages 710 containing advertising content back to advertisers 160, ad servers 180, or directly to client devices 150. Rules may be used both to send messages 710 automatically, and also to respond to requests 706 for advertising material. Rules may be stored in a store or database (not shown).

Rules for the sending of messages 710 may be specified using one or more rule antecedents and one or more rule consequents. A rule may specify an airing criteria, a temporal criteria, a geographical criteria, a demographic criteria, and a viewed content criteria. For example, a rule may embody the logic of "If advertisement X airs during show Y, then send message N to web ID M." Rules may be provided by advertisers 160 to the identification server 130 to determine when messages 710 containing their advertising content are sent to client devices 150. Generally some criteria, such as airing criteria and temporal criteria indicate under what conditions a message 710 is to be sent, while other criteria such as geographical criteria, demographic criteria, and viewed content criteria indicate the population of web IDs who will receive the message 710.

For rules containing only airing criteria, temporal criteria, geographic criteria, and in some cases demographic criteria, messages 710 may be sent without performing SM to event alignment 322, or web ID to SM ID alignment 326. Messages 710 may be sent according to these rules using message selection 330, event airing detection 314, and the TV show to ad overlap process 318. In contrast, for some rules containing demographic criteria and/or viewed content criteria, in addition the processes above, SM to event alignment 322 and web ID to SM ID alignment 326 are used to send messages 710 as well.

Airing Criteria

Airing criteria specifies the trigger for when an a message 710 is to be sent. Airing criteria in a rule may take the form "if advertisement X airs during show Y." Generally, an airing criteria specifies that if a given advertisement or TV show has aired, then a message 710 is to be sent responsive to that airing. The remainder of the rule may specify the content of the message 710 who the recipients of the message 710 will be. Whether an airing criteria of a rule is met may be determined using the event airing detection 314 engine as well as using TV show to ad overlap 318 engine.

Temporal Criteria

Temporal criteria specifies how close in time to the airing of a time based media event a web ID in a request 706 must have visited a website requesting advertising content in order to receive the message 710 from the identification server 130. By limiting the time when a message may be sent, the identification server 130 can ensure that the messages 710 sent occur close in time (e.g., within 30 seconds, within 5 minutes, within 2 days) to the actual airing of the event. For example, a temporal criteria "if a website request is received from a web ID within X seconds of the airing of TV show Y, send message Z to that web ID in response to the request."

Geographical Criteria

Geographical criteria specifies a geographical region requirement for the potential recipients of a message 710. For example, if a request 706 containing a web ID is received for advertising content, an internet protocol (IP) address (or other metadata) contained within the web address (or contained in an associated cookie) may be analyzed to determine the geographical location in the real world of the user associated with the web ID. This analysis may be performed by the message selection engine 330. The geographical location of the user associated with the web ID may be compared to a geographical region requirement in a rule to determine if the user's location is within the specified region. If it is, they may be sent the message 710. If not, they will not receive the message 710. Geographical criteria is useful for advertisers 160 who are only located in particular real world geographic regions, and who wish to target their advertising to those regions. An example of a geographic criteria may be "if advertisement Y airs during TV show Z, then send message N to web IDs in geographic region M."

Demographic Criteria

Demographic criteria specifies that a message 710 should only be sent to web IDs associated with users of a certain demographic. Demographic criteria may include, for example, age, gender, socioeconomic status, interests, hobbies, and group membership. The demographic of a user associated with a web ID may be determined from one or more cookies that may be associated with the web ID. Demographics may be determined internally by the identification server 130, or may be determined externally. For example, demographic information may be included in requests 706 received from advertisers 160, ad servers 180, and web servers 170. An example of a demographic criteria may be "if the user associated with a web ID in a request is of demographic W then send message N to in the message in response to the request", or alternatively the demographic criteria may be "if advertisement Y airs during TV show Z then send message N to web IDs of demographic W."

Demographic criteria may alternatively require that a time-based media event have match a particular demographic before a message 710 may be sent. The demographic of an advertisement may be provided by the advertiser 160. The demographic of a TV show may be part of the electronic programming guide data 304, or it may be received from external sources. For example, entities such as NIELSEN and KANTAR organize data about the demographics of people who watch various TV shows. For example, it may be specified that a particular TV show is associated with watches within the age range of 18-29. An example of a rule that incorporates both the demographics of the recipient of the message 710 as well as the demographic of a TV show may be "if the user associated with a web ID in a request is of demographic W and if advertisement Y airs during TV show Z, and TV show Z is also associated with demographic W, then send message N in response to the request," or alternatively the demographic criteria may be "if advertisement Y airs during TV show Z of demographic W, then send message N to web IDs also of demographic W."

As an alternative to obtaining the demographic of a TV show or advertisement from an external source, the demographic may also be determined using SM to event alignment 322. The SM content items contained in the SM to event mapping store 324 for time-based media events of a TV shows (e.g., all episodes) may be analyzed to determine the entire population of SM IDs who have authored a SM content item regarding a given TV show. The SM content items of those SM IDs may be analyzed to determine the demographics of those SM IDs. For example, for the TV show "Top Gear" it may be determined from that the majority of SM content items related to "Top Gear" are posted by males. As a consequence, "Top Gear" events may be associated with the male demographic.

Viewed Content Criteria

A viewed content criteria specifies that in order to receive a message 710 it is determined that the potential recipient is likely to have seen a particular TV show or advertisement. For example, it may be specified that a request 706 containing a web ID is associated with a SM ID that is likely to have seen a particular time-based media event (e.g., a specific TV show or advertisement), or at least one in a series of related time-based media events (e.g., any episode of a particular TV show). The determination of whether a viewed content criteria is met may be performed using SM to event alignment 322 and web ID to SM ID alignment 326 to determine what events a user is likely to have seen, as described above. An example of a viewed content criteria may be "if the user associated with a web ID in a request is likely to have seen episode X of TV show Y, send message N." Alternatively, the viewed content criteria may be "if advertisement Y airs during TV show Z, send message N to all web IDs likely to have seen advertisement Y."

Other Rule Qualifiers and Use of Rules in Other Contexts

Rules may also contain other qualifiers. As some advertisers show the same advertisement multiple times during a TV show, the rules can also precisely identify a time (or time window) at which an advertisement aired, the number of messages to be sent in response to the advertisement, or the advertisement's sequence position (e.g., first appearance, second appearance, etc.). Sequence position is useful where the advertiser does not know in advance exactly when its advertisements may appear, and to overcome variations in program scheduling. Rules may also specify that a message 710 is to be sent the next time the recipient user logs into the SNS, the next time the user authors a content item on the relevant TV show or advertisement, or that the message 710 may be sent at anytime in the future.

Additionally, although the rules described above have been described in the TV, audio, and time-based media advertisement context, rules may be created for any number of purposes. For example, rules may be provided by advertisers 160 for determining whether a user has an interest in a topic. For example, an advertiser 160 may be interested in knowing whether a user is a pet owner. As above, a received web ID may be correlated with a SM ID using web ID to SM ID alignment 326, and the interests of a SM ID in a topic may be determined using the process described in FIG. 5 as above. A rule associated with this determination of interest may, for example, be "If web ID X has sufficient interest in topic Y, send message Z to web ID X."

Additional Considerations

Although TV and advertising domains are described above, the methods described herein can be adapted to any domain using time-based media (e.g., radio). The method of adaptation is general across different domains. Techniques and features used for event segmentation and annotation are adapted to reflect domain specific characteristics. For example, detecting events in football exploits the visibility of grass as it is represented in the color distributions in a video frame, while detecting events in news video or audio clip may exploit clues in the closed captioning stream.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules or engines, without loss of generality. The described operations and their associated modules or engines may be embodied in software, firmware, hardware, or any combinations thereof.

Any of the steps, operations, or processes described herein may be performed or implemented with one or more hardware or software modules or engines, alone or in combination with other devices. In one embodiment, a software module or engine is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be persistently stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system, the system comprising:
an identification server comprising at least one computer processor, the identification server configured to:
receive a request for relevant media content for a web identity of a user;
identify a television media event associated with a geographical region where the event was aired and a time the event was aired;
identify social media content items broadcasted by a web-based social networking system and authored by a plurality of social media identities, each social media content item comprising a plurality of features;
determine, by the computer processor, that at least one of social media content items is relevant to the television media event, wherein determining relevancy of one of the social media content items comprises determining a confidence score that is based on the features of the social media content item and the time of airing;
select media content relevant to the television media event;
access a correlation between the web identity of the user and one of the plurality of social media identities who authored the at least one relevant social media content item, the correlation based on a comparison of the web identity's web browsing history to the social media content items authored by the one of the plurality of social media identities;
provide the selected media content for the web identity based on the correlation and determination of relevancy.

2. The system of claim 1, wherein the social media content items are publicly broadcasted.

3. The system of claim 1, wherein to determine relevancy of one of the social media content items, the identification server is further configured to:
extract the set of features from the social media content item, the set of features comprising at least one geo-temporal feature, at least one content feature, and at least one authority feature, and
determine the confidence score based on the extracted features.

4. The system of claim 3, wherein the at least one geo-temporal feature comprises a time of authorship of the social media content item and a geographical region of authorship of the social media content item, and wherein determining the confidence score comprises:
processing a geo-temporal sub-function based on a time difference between the time of authorship and the time the event was aired, and further based on a spatial difference between the geographical region of authorship and the geographical region where the event was aired.

5. The system of claim 3, wherein determining the confidence score comprises:
processing an authority sub-function based on a prior probability that the social media identity authored prior social media content items regarding other television media events similar to the event.

6. The system of claim 1 further configured to determine the correlation between the web identity and the social media identity.

7. The system of claim 6 wherein to determine the correlation between the web identity and the social media identity the system is further configured to:
access a cookie indicating a plurality of websites visited by the web identity;
extract from the social media content items a plurality of web links and a plurality of times when the social media content items including the web links were authored;
extract from the cookie the visited websites and a plurality of times when the websites were visited;
match the web links and times associated with the social media content items to the visited websites and times associated with the cookie;
determine a number of matches indicative of a probability that the web identity is the social media identity based on the comparison.

8. The system of claim 7 wherein the extracting from the social media content items comprises time indexing the web links of the social media content items into a plurality of time bins, and wherein matching comprises matching the web links in each time bin to the visited websites and times from the cookie.

9. The system of claim 1, wherein the selected media content includes at least one advertisement related to the advertisement media event.

10. A computer-executed method for comprising:
receiving a request for relevant media content for a web identity of a user;
identifying a television media event associated with a geographical region where the event was aired and a time the event was aired;

identifying social media content items broadcasted by a web-based social networking system and authored by a plurality of social media identities, each social media content item comprising a plurality of features;

determining, by the computer processor, that at least one of the social media content items is relevant to the television media event, wherein determining relevancy of one of the social media content items comprises determining a confidence score that is based on the features of the social media content item and the time of airing;

selecting media content relevant to the television media event;

accessing a correlation between the web identity of the user and one of the plurality of social media identities who authored the at least one relevant social media content item, the correlation based on a comparison of the web identity's web browsing history to the social media content items authored by the one of the plurality of social media identities;

providing the selected media content for the web identity based on the correlation and determination of relevancy.

11. The computer-executed method of claim 10, wherein the social media content items are publicly broadcasted.

12. The computer-executed method of claim 10, wherein determining relevancy of one of the social media content items further comprises:

extracting the set of features from the social media content item, the set of features comprising at least one geo-temporal feature, at least one content feature, and at least one authority feature, and determining the confidence score based on the extracted features.

13. The computer-executed method of claim 12, wherein the at least one geo-temporal feature comprises a time of authorship of the social media content item and a geographical region of authorship of the social media content item, and wherein determining the confidence score comprises:

processing a geo-temporal sub-function based on a time difference between the time of authorship and the time the event was aired, and further based on a spatial difference between the geographical region of authorship and the geographical region where the event was aired.

14. The computer-executed method of claim 12, wherein determining the confidence score comprises:

processing an authority sub-function based on a prior probability that the social media identity authored prior social media content items regarding other television media events similar to the event.

15. The computer-executed method of claim 10 further comprising determining the correlation between the web identity and the social media identity.

16. The computer-executed method of claim 15 wherein determining the correlation comprises:

accessing a cookie indicating a plurality of websites visited by the web identity;

extracting from the social media content items a plurality of web links and a plurality of times when the social media content items including the web links were authored;

extracting from the cookie the visited websites and a plurality of times when the websites were visited;

matching the web links and times associated with the social media content items to the visited websites and times associated with the cookie;

determining a number of matches indicative of a probability that the web identity is the social media identity based on the comparison.

17. The computer-executed method of claim 16 wherein the extracting from the social media content items comprises time indexing the web links of the social media content items into a plurality of time bins, and wherein matching comprises matching the web links in each time bin to the visited websites and times from the cookie.

18. The computer-executed method of claim 10, wherein the selected media content includes at least one advertisement related to the advertisement media event.

* * * * *